(12) United States Patent
Kise

(10) Patent No.: US 8,913,279 B2
(45) Date of Patent: Dec. 16, 2014

(54) INFORMATION PROCESSING APPARATUS THAT PROVIDES HOT FOLDERS, INFORMATION PROCESSING METHOD, AND NON-TRANSITORY COMPUTER-READABLE MEDIUM

(71) Applicant: Canon Kabushiki Kaisha, Tokyo (JP)

(72) Inventor: Takashi Kise, Yokohama (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/832,411

(22) Filed: Mar. 15, 2013

(65) Prior Publication Data

US 2013/0286431 A1 Oct. 31, 2013

(30) Foreign Application Priority Data

Apr. 25, 2012 (JP) .................................. 2012-100352

(51) Int. Cl.
*G06F 3/12* (2006.01)
(52) U.S. Cl.
CPC .............. *G06F 3/1296* (2013.01); *G06F 3/127* (2013.01); *G06F 3/1284* (2013.01); *G06F 3/1253* (2013.01); *G06F 3/1285* (2013.01); *G06F 3/1204* (2013.01)
USPC .......................................... 358/1.15; 715/277
(58) Field of Classification Search
CPC ....................................................... G06F 3/127
USPC ........................................................ 358/1.15
See application file for complete search history.

(56) References Cited

U.S. PATENT DOCUMENTS

| 2003/0080960 | A1* | 5/2003 | Chang ........................... 345/423 |
| 2006/0256360 | A1* | 11/2006 | Kayama ....................... 358/1.13 |
| 2008/0297833 | A1* | 12/2008 | Hatakeyama ................ 358/1.15 |
| 2010/0039668 | A1 | 2/2010 | Kayama |
| 2011/0242588 | A1* | 10/2011 | Kawai et al. ................. 358/1.15 |

FOREIGN PATENT DOCUMENTS

JP 2003233486 A 8/2003
JP 2006293554 A 10/2006

\* cited by examiner

*Primary Examiner* — Benny Q Tieu
*Assistant Examiner* — Michael Y Tzeng
(74) *Attorney, Agent, or Firm* — Rossi, Kimms & McDowell LLP

(57) ABSTRACT

An apparatus comprises a construction unit which constructs a setting value tree expressed in a tree structure by defining a parent-child relationship between plural job setting values; a generation unit which generates plural hot folders corresponding to job setting value combinations respectively constructing plural setting value trees; and a display unit which displays plural hot folders, of the plural hot folders generated, which correspond to job setting value combinations which are selectable at levels designated by the plural setting value trees, wherein job setting values of the plural hot folder are respectively inherit the job setting values superordinate to combined job setting values on the plural setting value trees corresponding to the plural hot folders, and the display unit displays job setting values corresponding to hot folders in accordance with a hierarchical structure of each of the plural setting value trees.

15 Claims, 27 Drawing Sheets

F I G. 10
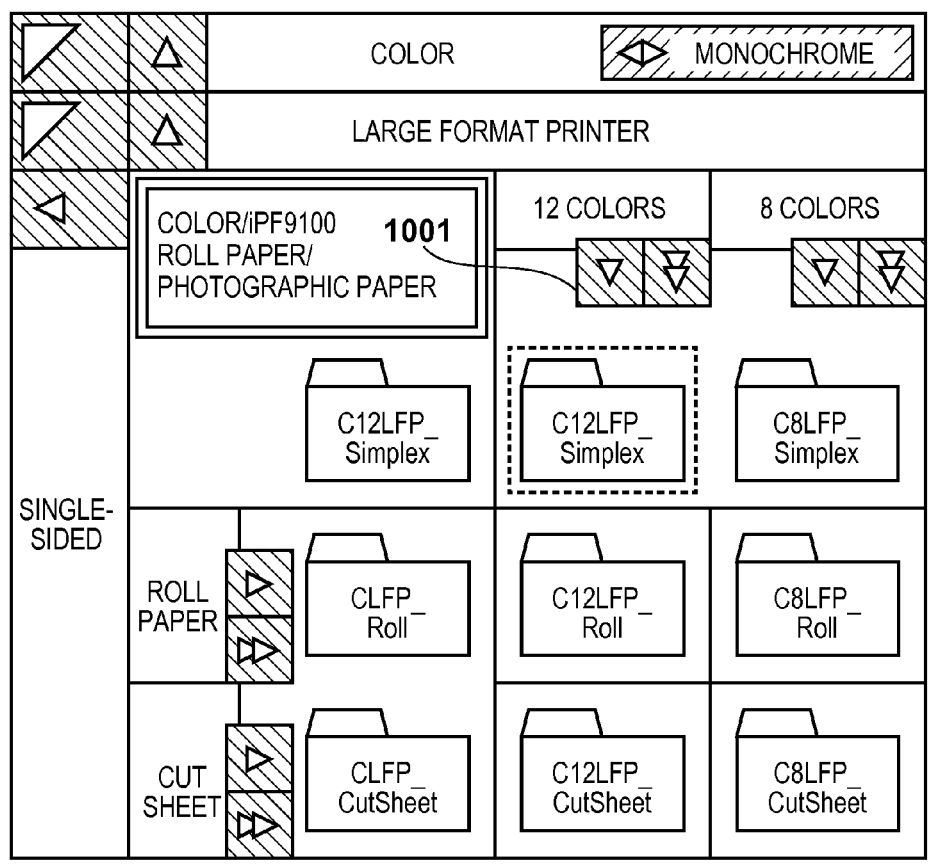

F I G. 12
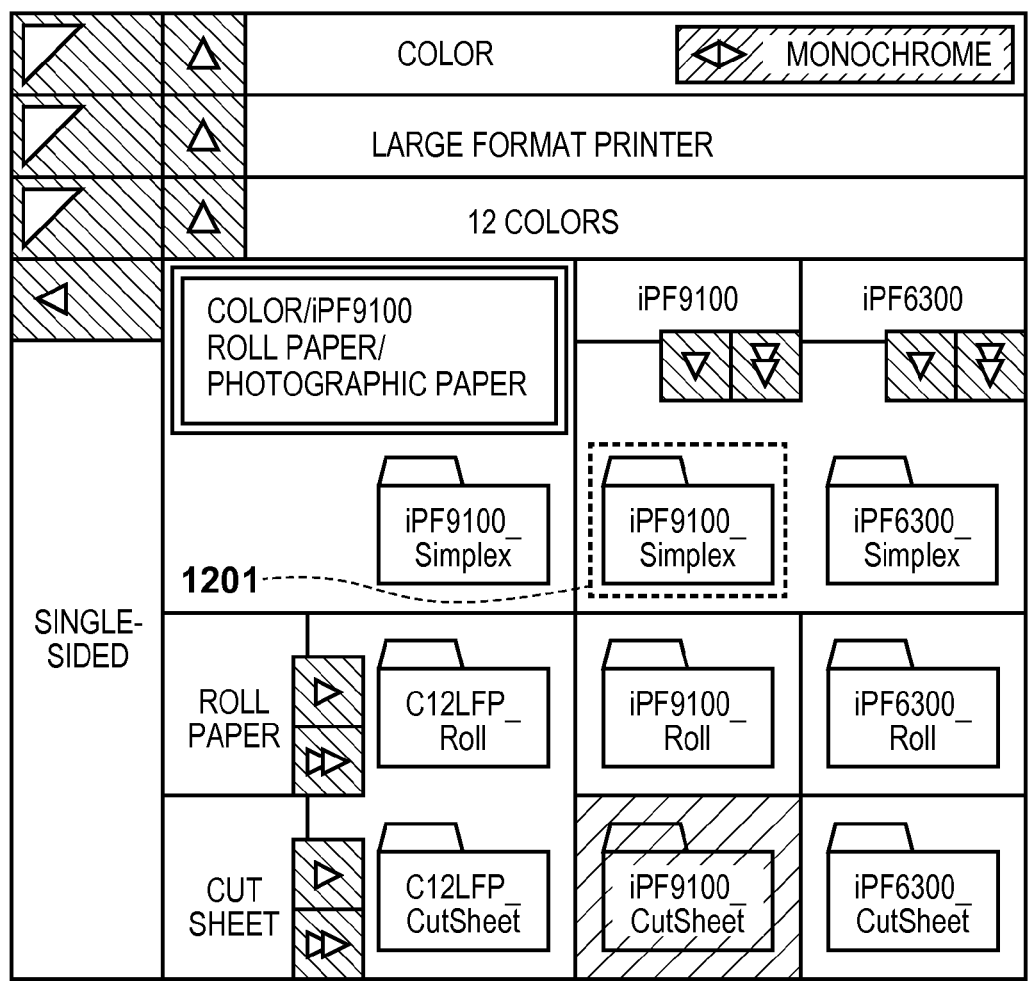

F I G. 14
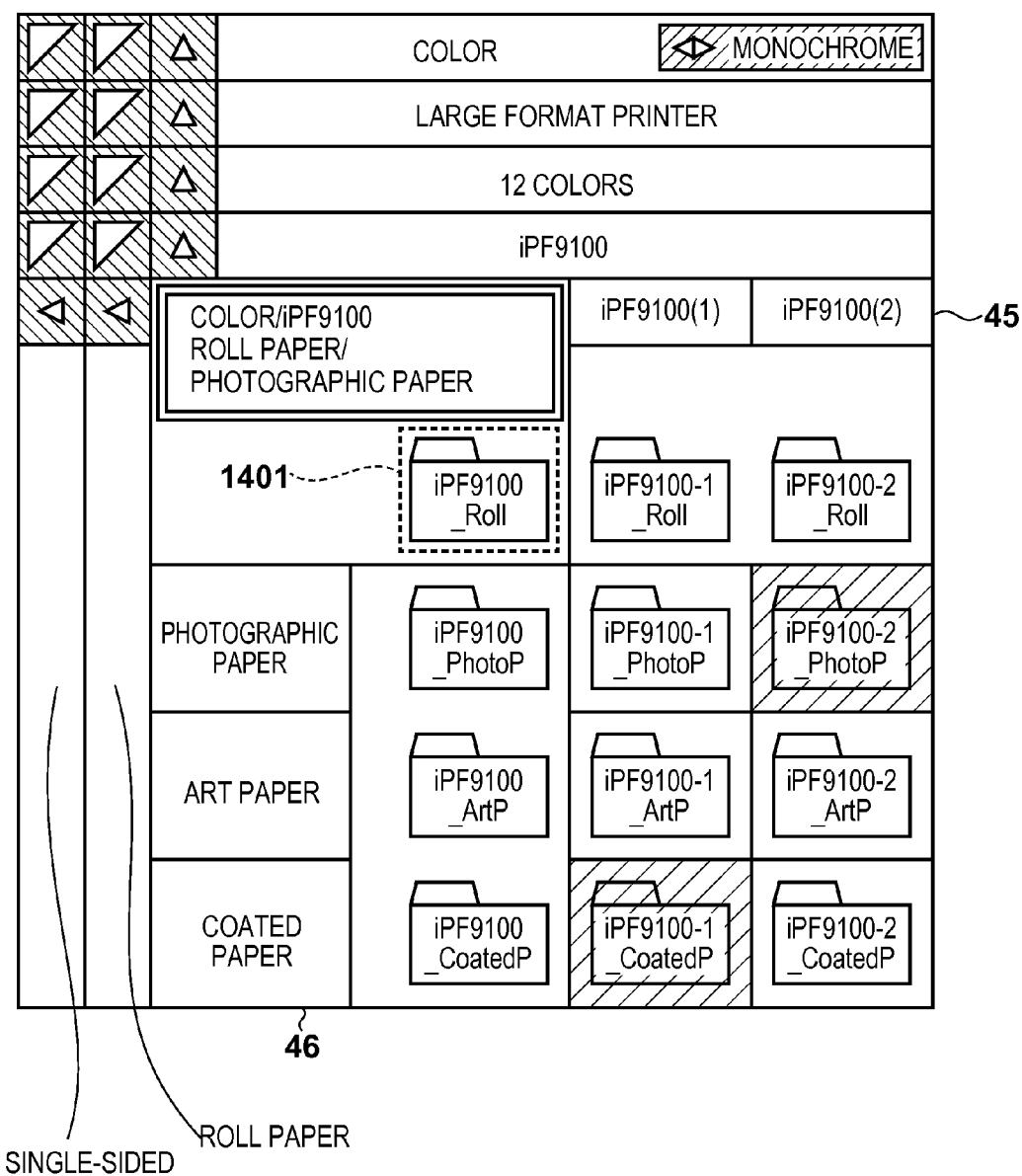

F I G. 15
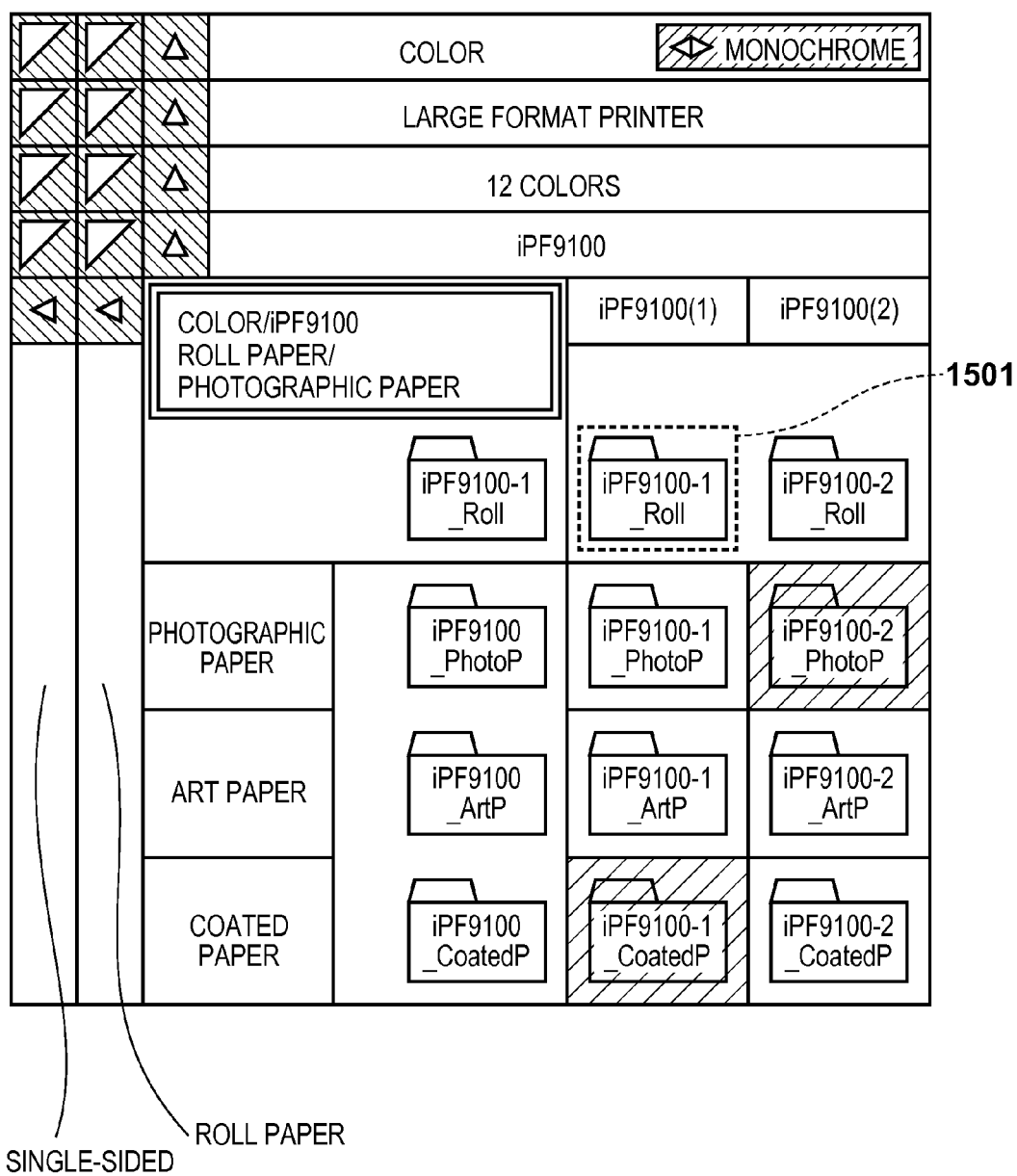

F I G. 17
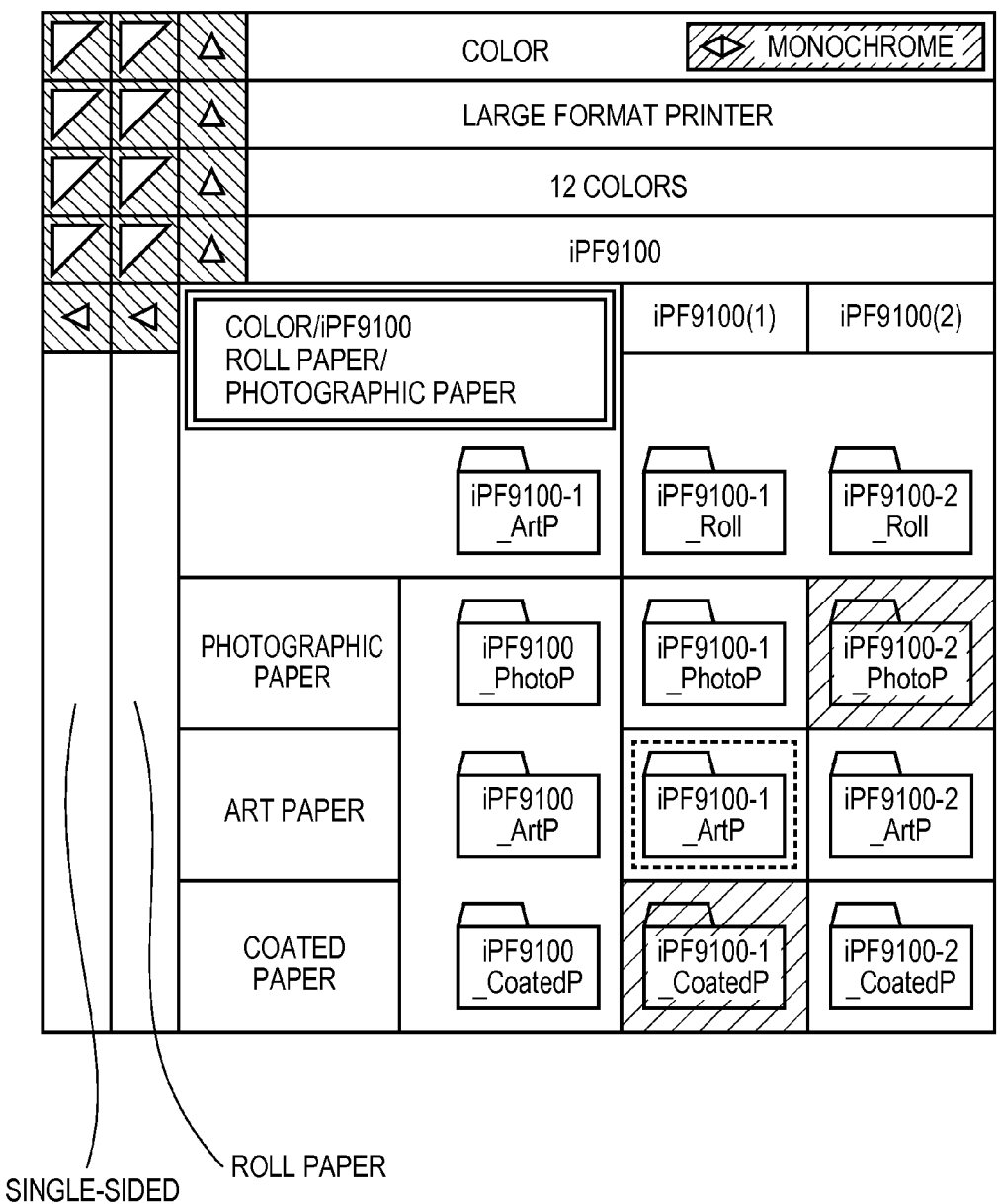

F I G. 22
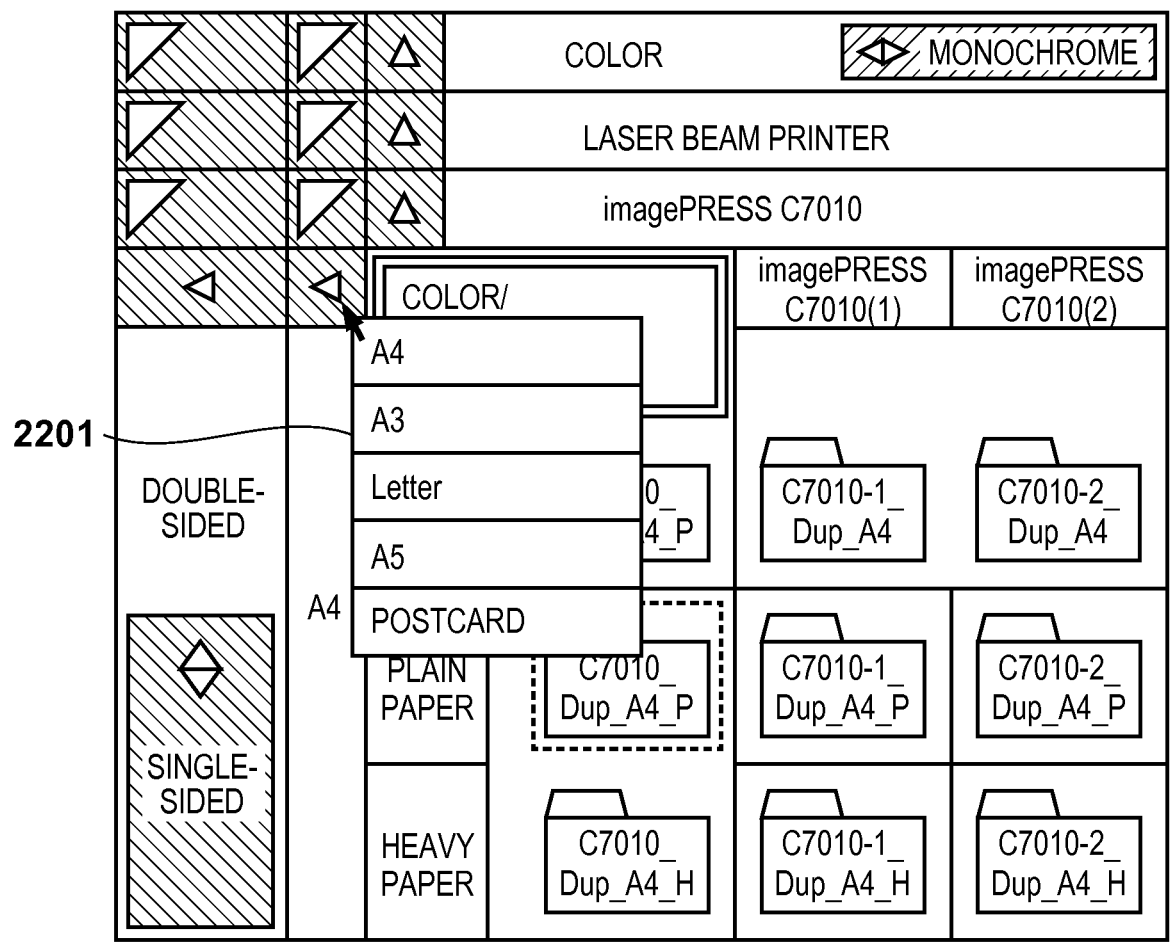

FIG. 23A

| NAME | UPDATE DATE AND TIME | TYPE | SIZE |
|---|---|---|---|
| JobA | ... | FOLDER | ... |
| JobB | ... | FOLDER | ... |
| JobC | ... | FOLDER | ... |

2301

- CUT
- COPY
- DELETE
- CHANGE NAME — 2302
- INPUT JOB

FIG. 23B

| NAME | UPDATE DATE AND TIME | TYPE | SIZE |
|---|---|---|---|
| JobA | ... | FOLDER | ... |
| JobB | ... | FOLDER | ... |
| JobC | ... | FOLDER | ... |

- CUT
- COPY
- DELETE
- CHANGE NAME
- INPUT JOB — 2303

FIG. 24

| BUTTON | TARGET | OPERATION | CONTENTS |
|---|---|---|---|
|  | SETTING VALUE TREE A | ONE-EXPANSION | TO SELECT TARGET BRANCH AND EXPAND BY ONE LEVEL |
|  | | ALL-EXPANSION | TO SELECT PREDETERMINED VALUE OF TARGET BRANCH AND EXPAND ALL TREES DOWN TO PREDETERMINED VALUE |
|  | | COLLAPSE | SELECT TARGET BRANCH AND COLLAPSE BY ONE LEVEL |
|  OTHER CANDIDATES | | SWITCHING | SELECT OTHER CANDIDATES AT TARGET LEVEL |
|  | SETTING VALUE TREE B | ONE-EXPANSION | TO SELECT TARGET BRANCH AND EXPAND BY ONE LEVEL |
|  | | ALL-EXPANSION | TO SELECT PREDETERMINED VALUE OF TARGET BRANCH AND EXPAND ALL TREES DOWN TO PREDETERMINED VALUE |
|  | | COLLAPSE | SELECT TARGET BRANCH AND COLLAPSE BY ONE LEVEL |
|  OTHER CANDIDATES | | SWITCHING | SELECT OTHER CANDIDATES AT TARGET LEVEL |
|  PREDETERMINED VALUE A PREDETERMINED VALUE B | SETTING VALUE TREES A AND B | ALL-EXPANSION | SELECT CURRENT PREDETERMINED VALUE AND EXPAND ALL TREES DOWN TO PREDETERMINED VALUE |
|  | | COLLAPSE | SELECT TARGET BRANCH AND COLLAPSE BY ONE LEVEL |

SETTING VALUE TREE A

SETTING VALUE TREE B

INFORMATION PROCESSING APPARATUS THAT PROVIDES HOT FOLDERS, INFORMATION PROCESSING METHOD, AND NON-TRANSITORY COMPUTER-READABLE MEDIUM

BACKGROUND OF THE INVENTION

1. Field of the Invention

The present invention relates to an information processing apparatus, an information processing method, and a non-transitory computer-readable medium and, more particularly, to a system which manages and provides a hot folder which issues a job for processing data.

2. Description of the Related Art

Japanese Patent Laid-Open No. 2003-233486 discloses a technique of collectively registering a plurality of printers as virtual printers and managing distributed printing and the like.

Japanese Patent Laid-Open No. 2006-293554 discloses a hot folder technique of performing printing operation or the like using a printer by copying a file to a hot folder in which job setting has been made.

According to the prior art, if the number of combinations of print setting items increases and the number of virtual printers or hot folders registered increases, it is difficult to find a hot folder with desired settings. Furthermore, it takes time and effort to separately register information of each virtual printer or hot folder in association with a corresponding one of all combinations of settings.

SUMMARY OF THE INVENTION

The present invention has been made in consideration of the above problems and can easily find a hot folder with desired settings from plural hot folders. The present invention can also reduce the trouble of adding and deleting hot folders.

According to one aspect of the present invention, there is provided an information processing apparatus which provides a hot folder which issues a job with job setting values corresponding to the hot folder by inputting the job data, the apparatus comprising: a construction unit configured to construct a setting value tree expressed in a tree structure by defining a parent-child relationship between plural job setting values; a generation unit configured to generate plural hot folders corresponding to job setting value combinations respectively constructing plural setting value trees; and a display unit configured to display plural hot folders, of the plural hot folders generated by the generation unit, which correspond to job setting value combinations which are selectable at levels designated by the plural setting value trees, wherein job setting values of the plural hot folder are respectively inherit the job setting values superordinate to combined job setting values on the plural setting value trees corresponding to the plural hot folders, and the display unit displays job setting values corresponding to hot folders in accordance with a hierarchical structure of each of the plural setting value trees.

According to another aspect of the present invention, there is provided an information processing method which provides a hot folder which issues a job with job setting values corresponding to the hot folder by inputting the job data, the method comprising: constructing a setting value tree expressed in a tree structure by defining a parent-child relationship between plural job setting values; generating plural hot folders corresponding to job setting value combinations respectively constructing plural setting value trees; and displaying plural hot folders, of the plural hot folders generated in the generating step, which correspond to job setting value combinations which are selectable at levels designated by the plural setting value trees, wherein job setting values of the plural hot folder are respectively inherit the job setting values superordinate to combined job setting values on the plural setting value trees corresponding to the plural hot folders, and in the displaying step, job setting values corresponding to hot folders are displayed in accordance with a hierarchical structure of each of the plural setting value trees.

According to another aspect of the present invention, there is provided a non-transitory computer-readable medium storing a program for causing a computer to function as a construction unit configured to construct a setting value tree expressed in a tree structure by defining a parent-child relationship between plural job setting values, a generation unit configured to generate plural hot folders corresponding to job setting value combinations respectively constructing plural setting value trees, and a display unit configured to display plural hot folders, of the plural hot folders generated by the generation unit, which correspond to job setting value combinations which are selectable at levels designated by the plural setting value trees, wherein job setting values of the plural hot folder are respectively inherit the job setting values superordinate to combined job setting values on the plural setting value trees corresponding to the plural hot folders, and the display unit displays job setting values corresponding to hot folders in accordance with a hierarchical structure of each of the plural setting value trees.

The present invention facilitates searching for a hot folder with desired settings and improves the operation efficiency of the registration of hot folders.

Further features of the present invention will become apparent from the following description of exemplary embodiments (with reference to the attached drawings).

BRIEF DESCRIPTION OF THE DRAWINGS

FIG. 10 is a view showing a display example of a setting value tree combination window;

FIG. 12 is a view showing a display example of a setting value tree combination window;

FIG. 14 is a view showing a display example of a setting value tree combination window;

FIG. 15 is a view showing a display example of a setting value tree combination window;

FIG. 17 is a view showing a display example of a setting value tree combination window;

FIG. 22 is a view showing a display example of a setting value tree combination window;

FIGS. 23A and 23B are views each showing a user interface for issuing an instruction to input job data;

FIG. 24 is a table for explaining an example of the buttons provided by a user interface;

DESCRIPTION OF THE EMBODIMENTS

The embodiments of the present invention will be described in detail with reference to the accompanying drawings. Note that each arrangement in the following embodiments is merely an example. However, the present invention is not limited to the arrangements shown in the accompanying drawings.

First Embodiment

[Hardware Arrangement]

Figure 2:
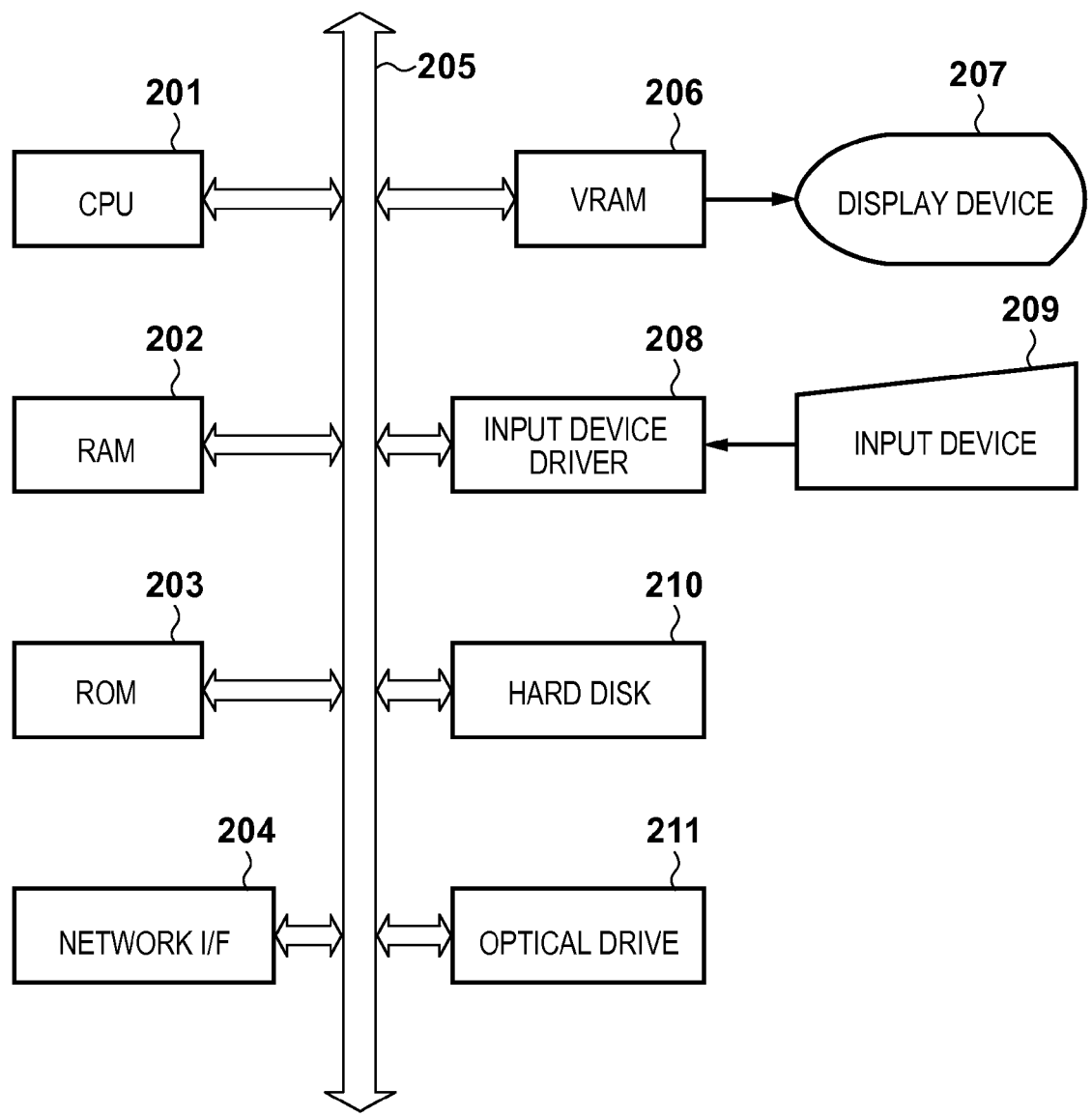
FIG. 2 is a block diagram showing an example of a hardware arrangement.

As an apparatus to which a hot folder management system of the present invention can be applied, a PC (Personal Computer) as a general information processing apparatus can be presented. FIG. 2 is a block diagram showing an example of the arrangement of an information processing apparatus to which the present invention can be applied. The information processing apparatus includes CPU 201, RAM 202, ROM 203, network I/F 204, VRAM 206, input device driver 208, hard disk 210, and optical drive 211. The respective constituent elements are communicatively connected to each other inside the apparatus via a system bus 205. Display device 207 is connected to VRAM 206 to display various types of user interfaces (to be described later). Input device 209 such as mouse or keyboard is connected to the input device driver 208 to receive inputs from the user.

In addition, the information processing apparatus is connected to one or plural image forming apparatuses via the network I/F 204. When job data is input to the hot folder provided by the information processing apparatus, the apparatus issues a job to a corresponding image forming apparatus. For example, a printer or MFP (Multifunction Peripheral) corresponds to an image forming apparatus in this embodiment.

In the information processing apparatus, various types of information are stored in the hard disk 210 as a storage unit or the like and presented to the user via the display device 207.

Assume that the CPU 201 implements various types of processing by reading out programs according to the present invention from the hard disk 210 to the RAM 202 or the like and executing them.

[System Arrangement]

Figure 1:
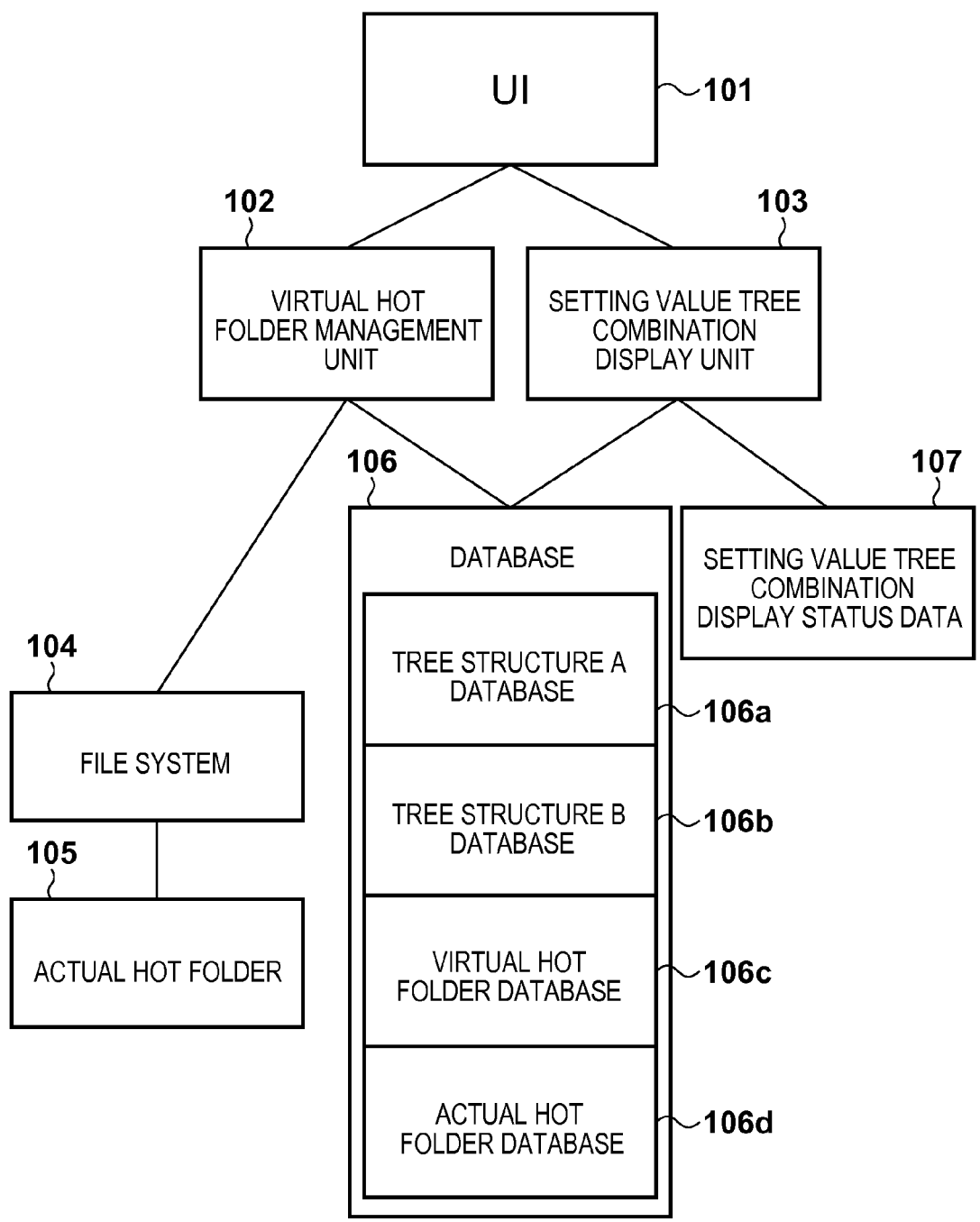
FIG. 1 is a block diagram showing an example of a system arrangement.

FIG. 1 is a block diagram showing a system arrangement according to an embodiment of the present invention. Note that a "virtual hot folder" in this specification is one hot folder made to correspond to one job setting combination and managed by a virtual hot folder management unit 102. One virtual hot folder is made to correspond to one or plural actual hot folders. On the other hand, an "actual hot folder" is one hot folder made to correspond to one job setting and managed by a file system 104. One actual hot folder is made to correspond to one or plural image forming apparatuses. That is, when the user inputs job data to a virtual hot folder, the information processing apparatus moves the job data to a proper actual hot folder in consideration of the status of the actual hot folder and the like. The information processing apparatus issues the job inputted in the actual hot folder to a proper image forming apparatus in consideration of the status and the like of image forming apparatuses. Although this specification will exemplify a job as a job for print processing, the present invention is not limited to this.

In this embodiment, the virtual hot folder management unit 102 manages virtual hot folders. A setting value tree combination display unit 103 controls display on a UI 101 in accordance with an instruction from the user.

In this embodiment, a database 106 includes a tree structure A database 106a, a tree structure B database 106b, a virtual hot folder database 106c, and an actual hot folder database 106d. Each database will be described in detail later.

When the user issues an instruction of inputting job data to a virtual hot folder via the UI 101, the virtual hot folder management unit 102 inputs the job data to an actual hot folder 105 by using information in the database 106 via the file system 104. The virtual hot folder management unit 102 updates information in the database 106 in accordance with a job status such as the normal termination or error of the job. Note that the file system 104 may hierarchically construct and implement hot folders.

When the user issues an instruction to change display such as expansion or collapse of a setting value tree via the UI 101, the setting value tree combination display unit 103 changes setting value tree combination display status data 107. The setting value tree combination display unit 103 presents the user with the updated setting value tree combination table information via the UI 101. When the user issues an instruction to change (for example, add, delete, or copy) the tree structure of a setting value tree, the setting value tree combination display unit 103 updates the database 106. A setting value tree, setting value tree combination table, various types of data, and UI display will be described in detail later with reference to the accompanying drawings.

[Setting Value Tree]

Figure 27A:
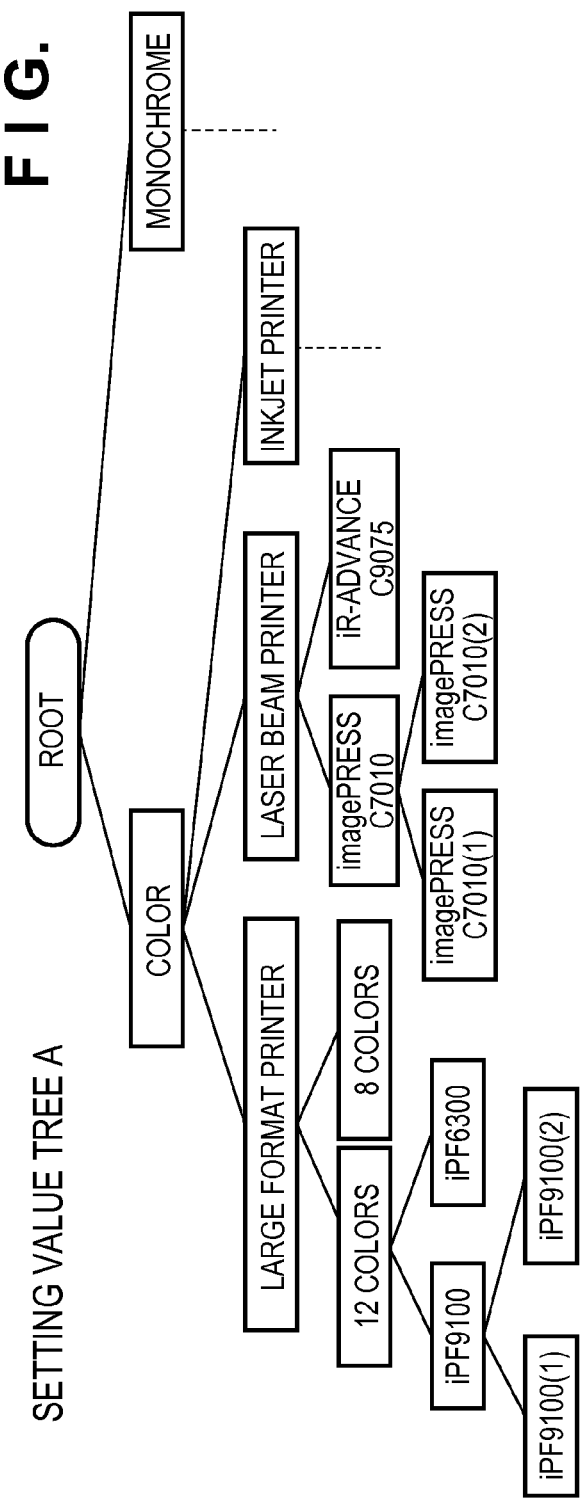
FIGS. 27A and 27B are tree diagrams each for explaining a concept of a setting value tree.
Figure 27B:
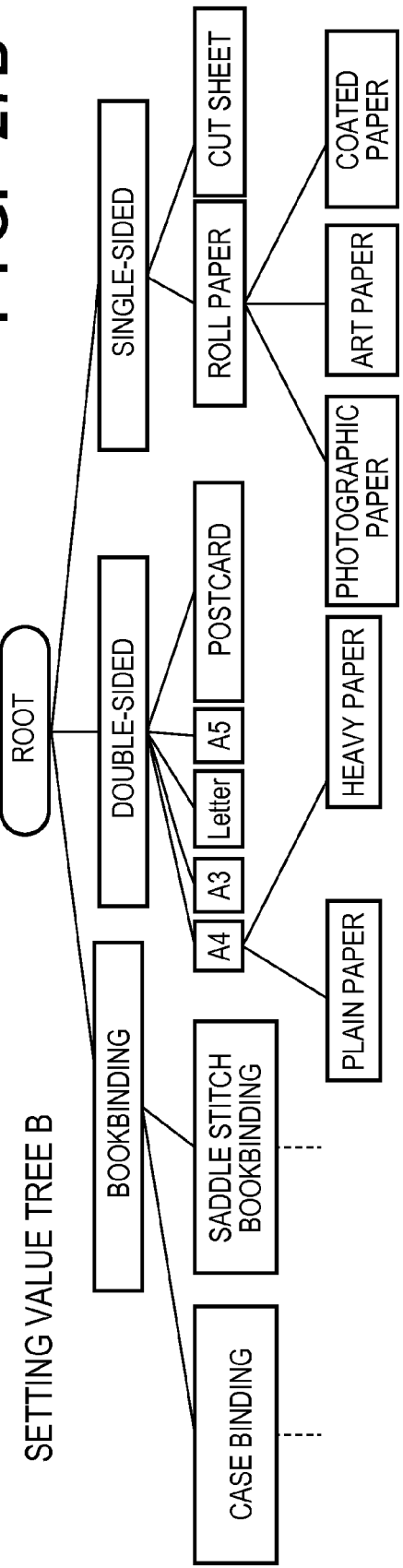

A setting value tree handled in this embodiment will be described. A setting value tree is expressed by a tree structure and defines the parent-child relationship (hierarchical relationship) between available job setting values of the respective setting items as branches. Setting values which can be selected in the same setting item have the same parent and are located at the same level. FIGS. 27A and 27B each show a concrete example of a setting value tree used in this embodiment. FIG. 27A shows part of an example of the arrangement of setting value tree A in this embodiment, which includes setting items set in consideration of the functions and types of image forming apparatuses. FIG. 27B shows part of an example of the arrangement of setting value tree B in the embodiment, which includes setting items set in consideration of printing media (product materials).

The root is located at the highest level of the tree. The transition of UI display will be described below with reference to the arrangements of setting value trees A and B. Note that the parent-child relationship between the respective setting items is not limited to this and may be changed at user's request or the like. In addition, functions may be added in accordance with the image forming apparatus connected to the information processing apparatus.

In this specification, the "expansion" of a setting value tree on the UI indicates the operation of selecting a branch at a requested level displayed on the UI and displaying branches subordinate to the selected branch. In addition, the "collapse" of a setting value tree indicates the operation of moving to a level superordinate to a branch at a requested level displayed on the UI and displaying branches at the superordinate level.

[Arrangement of Database]

FIGS. 25A, 25B, 26A, and 26B each show an example of the arrangement of the respective data used in this embodiment. Note that a concrete method of using data will be described, together with a concrete example of a UI. The hard disk 210 as a storage unit stores each data.

Figure 25A:
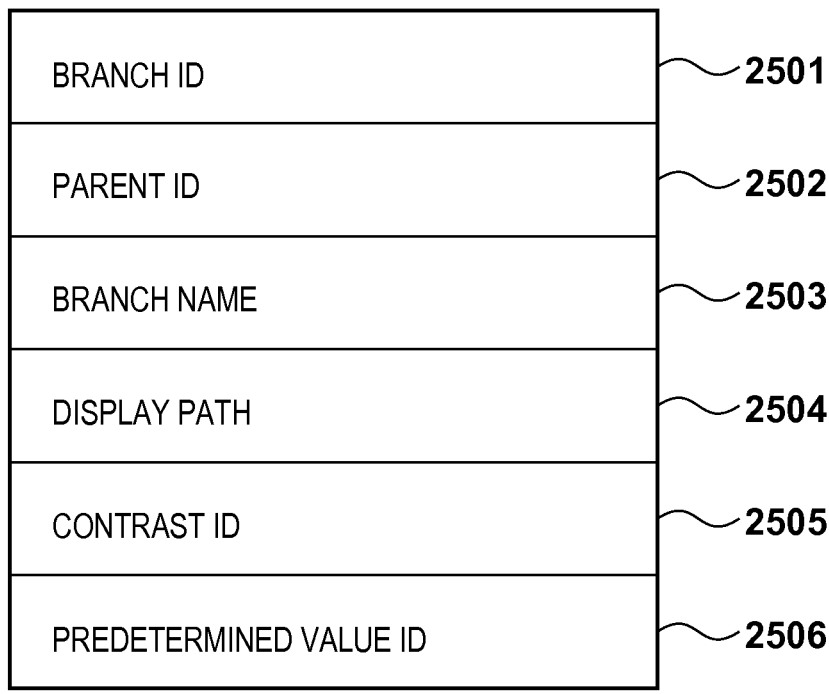
FIGS. 25A and 25B are tables showing the internal data structure of a tree structure database and the setting value tree combination display status data.

FIG. 25A shows an example of the arrangements of the internal data of the tree structure A database 106a and tree structure B database 106b stored in the database 106. One data set corresponds to one branch of tree. In this case, the tree structure A database 106a corresponds to the setting value tree A elements shown in FIG. 4, and the tree structure B database 106b corresponds to the setting value tree B elements.

Referring to FIG. 25A, the tree structure database includes a branch ID 2501, a parent ID 2502, a branch name 2503, a display path 2504, a contrast ID 2505, and a predetermined value ID 2506. The branch ID 2501 is an identifier for uniquely identifying a branch, and the branch ID of the root at the highest level is "0". The parent ID 2502 indicates to which branch of the setting value tree the corresponding branch is subordinate, thereby setting the branch ID of the parent branch. Note that the root branch (branch ID=0) has no value of parent ID.

In the branch name 2503, a character string indicating a display name is stored, which is displayed on the UI for the branch. In the display path 2504, a character string for displaying a path to the level of the branch is stored. For example, the use of a full path obtained by connecting the names of branches along a path from the root to the selected branch requires a long length, and hence the character string of the display path 2504 is used as a simplified representation. The contrast ID 2505 indicates another branch which can be set as a contrast in the same setting item. For example, in the case of the setting value tree A in FIG. 27A, "COLOR" and "MONOCHROME" can be branches to be contrasted to each other. Likewise, "LARGE FORMAT PRINTER", "LASER BEAM PRINTER", and "INKJET PRINTER" can be branches to be contrasted to each other. The predetermined value ID 2506 is an identifier for uniquely indicating the default value of the corresponding branch.

Figure 25B:
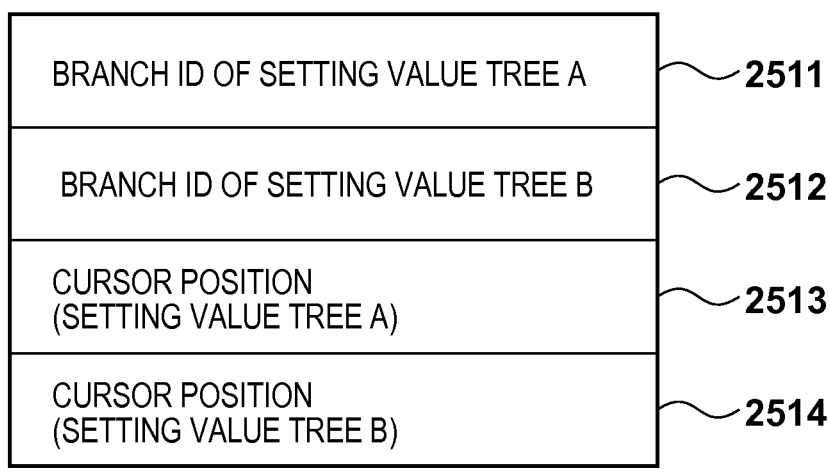

FIG. 25B shows an example of the arrangement of the setting value tree combination display status data 107 in FIG. 1. The setting value tree combination display status data 107 includes a branch ID 2511 of setting value tree A, a branch ID 2512 of setting value tree B, a cursor position (setting value tree A) 2513, and a cursor position (setting value tree B) 2514. The setting value tree combination display status data 107 indicates the branch IDs and cursor positions of setting value tree A and setting value tree B currently expanded on the UI.

Figure 26A:
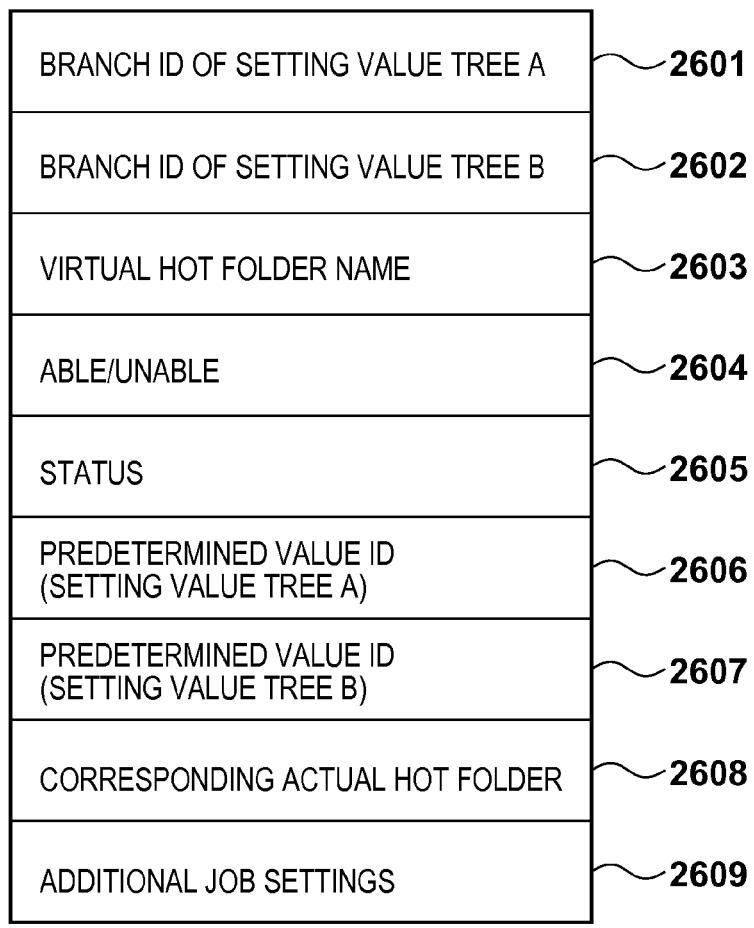
FIGS. 26A and 26B are tables showing the internal data structure of a virtual hot folder database and an actual hot folder database.

FIG. 26A shows an example of the arrangement of the internal data of the virtual hot folder database 106c stored in the database 106. The virtual hot folder database 106c includes the information of a virtual hot folder with a combination of branches of setting value tree A and setting value tree B. The virtual hot folder database 106c includes a branch ID 2601 of setting value tree A, a branch ID 2602 of setting value tree B, a virtual hot folder name 2603, an able/unable 2604, a status 2605, a predetermined value ID (setting value tree A) 2606, a predetermined value ID (setting value tree B) 2607, a corresponding actual hot folder 2608, and additional job settings 2609. The virtual hot folder name 2603 may be set by using the branch name 2503 in FIG. 25A and the like. The additional job settings 2609 is job settings to be added when a job is input to an actual hot folder.

Figure 26B:
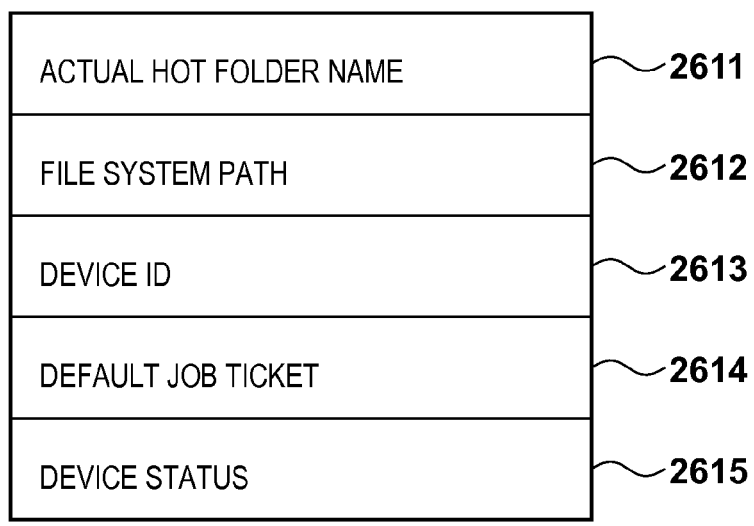

FIG. 26B shows an example of the arrangement of the internal data of the actual hot folder database 106d stored in the database 106. The actual hot folder database 106d includes an actual hot folder name 2611, a file system path 2612, a device ID 2613, a default job ticket 2614, and a device status 2615.

[Processing Sequence]

Figure 3:
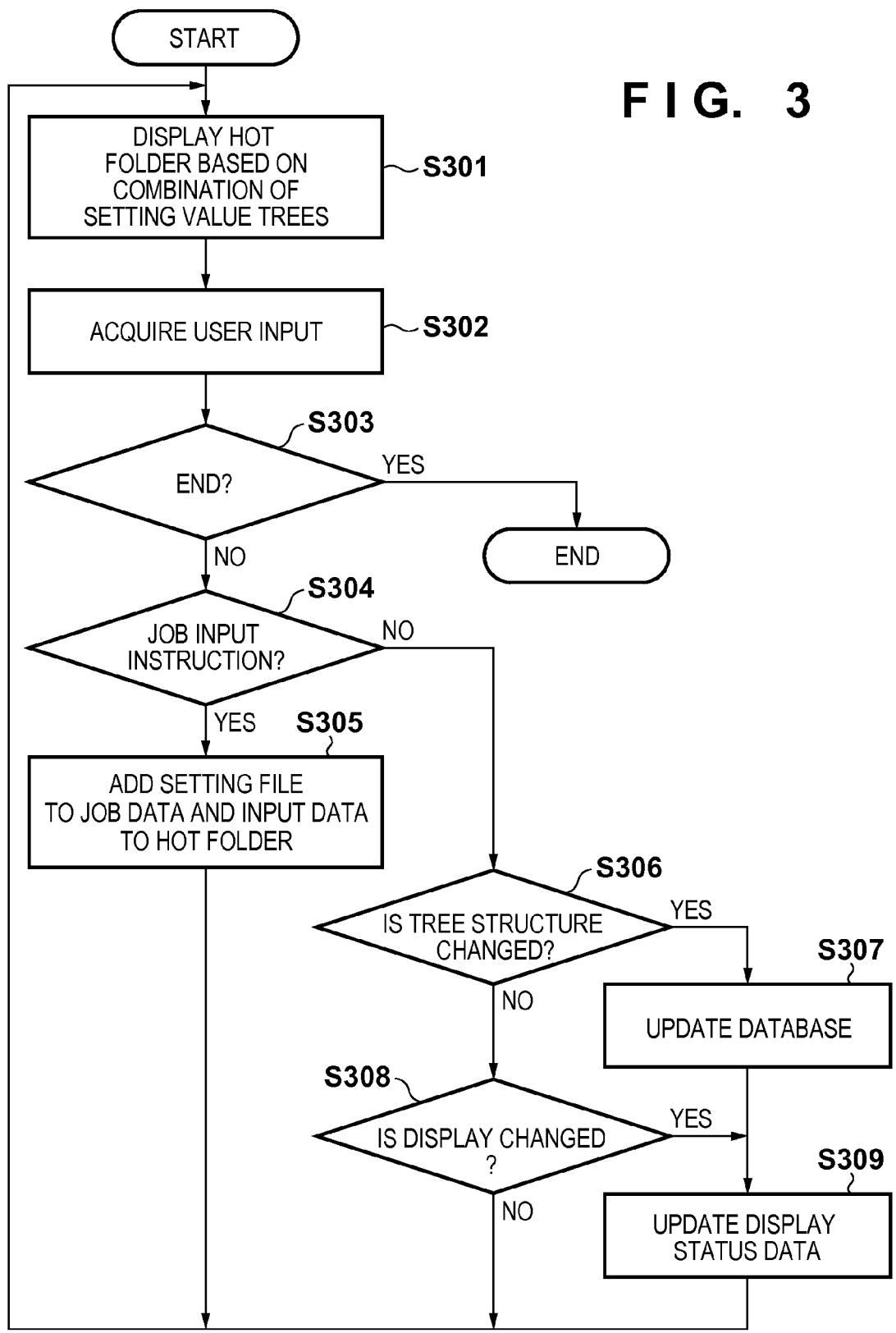
FIG. 3 is a flowchart according to the present invention.

FIG. 3 is a flowchart according to the present invention. The CPU 201 implements this sequence by, for example, reading out a program stored in the hard disk 210 to the RAM 202 or the like and executing the program.

In step S301, the setting value tree combination display unit 103 displays a hot folder based on a combination of setting value trees. The setting value tree combination display unit 103 displays information via the UI 101 in accordance with information of the database 106 and the setting value tree combination display status data 107.

In step S302, the UI 101 acquires a user input from the input device 209.

In step S303, the UI 101 determines the user input. If the input indicates the termination of the processing (YES in step S303), the UI 101 terminates the processing. If the input is an instruction other than the above instruction (NO in step S303), the process advances to step S304.

In step S304, the UI 101 determines the user input. If the input is an instruction to input a job (YES in step S304), the process advances to step S305. If the input is an instruction other than the above instruction (NO in step S304), the process advances to step S306.

In step S305, the virtual hot folder management unit 102 sends the job ticket file to which the setting information in the designated virtual hot folder is added and the designated job data to a corresponding actual hot folder via the file system 104. The flow then returns to step S301.

In step S306, the UI 101 determines the user input. If the input is an instruction to change the tree structure (YES in step S306), the process advances to step S307. Otherwise (NO in step S306), the process advances to step S308.

In step S307, the virtual hot folder management unit 102 updates the database 106 in accordance with the user's instruction to change the tree structure. The instruction to change the tree structure in this case includes, for example, instructions to add, delete, move, and copy a constituent element of the setting value tree. More specifically, this instruction includes, for example, an instruction to add a job setting value concerning the type of device or paper. In this case, as a job setting value to be newly added, information in FIG. 25A may be input. It is also possible to change the parent-child relationship (branch ID or parent ID) in the tree structure, the default value of a branch (predetermined value ID), a display setting (branch name or display path), or the like. Note that when changing the tree structure, a UI window (not shown) for changing settings may be provided. If new setting information is added or the setting information is changed, the virtual hot folder management unit 102 updates the arrangement of the tree structure and generates a virtual hot folder at corresponding to an each new combination of setting items. The process then advances to step S309.

In step S308, the UI 101 determines the user input. If the input is an instruction to change the display (YES in step S308), the process advances to step S309. If the input is an instruction other than the above instruction (NO in step S308), the process advances to step S301.

In step S309, the setting value tree combination display unit 103 updates the setting value tree combination display status data 107 in accordance with a user's instruction. The process then returns to step S301.

[Virtual Hot Folder Setting UI]
(Layout Arrangement of UI)

Figure 4:
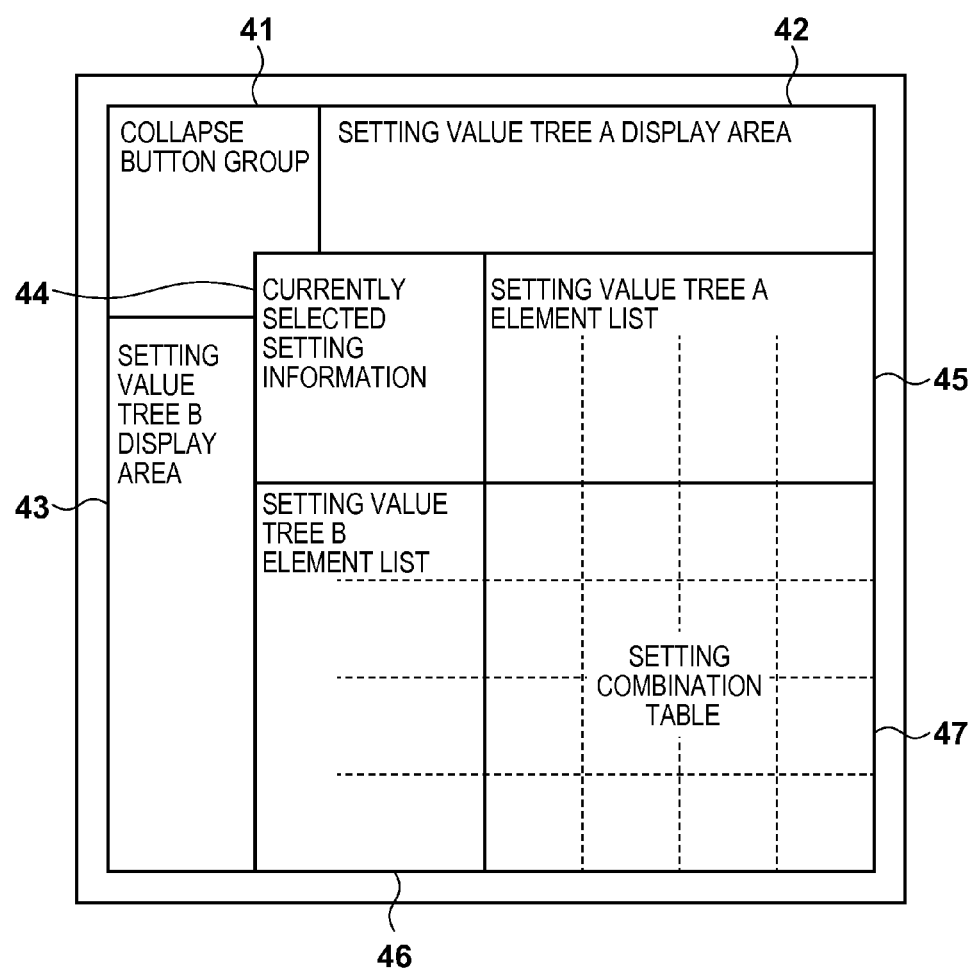
FIG. 4 is a view showing an example of the layout arrangement of a user interface, that is a setting value tree combination window.

FIG. 4 shows an example of the layout arrangement of a user interface (which corresponds to the UI 101 in FIG. 1 and will be referred to as a UI hereinafter) according to an embodiment of the present invention. The UI includes the following areas, a collapse button group 41, a setting value tree A display area 42, a setting value tree B display area 43, currently selected setting information 44, a setting value tree A element list 45, a setting value tree B element list 46, and a setting combination table 47.

The setting value tree A display area 42 displays a hierarchical structure from a branch below the root of setting value tree A to a selected branch in the order of levels defined. The setting value tree A element list 45 displays a list of setting item elements in which branches are expanded. Likewise, the setting value tree B display area 43 displays a hierarchical structure from a branch below the root of setting value tree B to a selected branch in the order of levels defined. The setting value tree B element list 46 displays a list of setting item elements in which branches are expanded. The setting combination table 47 displays virtual hot folders corresponding to combinations of setting items with the setting value tree A element list 45 and setting value tree B element list 46 in a tabular form. This embodiment uses a tabular form in which selectable branches of setting value tree A are arranged along the horizontal lines, and selectable branches of setting value tree B are arranged along the vertical lines.

The currently selected setting information 44 displays information concerning currently selected setting combinations. The collapse button group 41 displays buttons for collapsing setting value tree A and setting value tree B. With this collapse button, the user can designate an arbitrary level superordinate to the currently selected level on the setting value tree. Although not clearly shown in FIG. 4, a button for expanding setting value tree A is displayed in the area of the setting value tree A element list 45, and a button for expanding setting value tree B is displayed in the area of the setting value tree B element list 46. The respective types of buttons displayed on the UI according to this embodiment will be described with reference to FIG. 24.

(Buttons on UI)

FIG. 24 shows an example of buttons used on the UI according to this embodiment. Each button on the UI is used to change the display by expanding/collapsing a level corresponding to each setting item. In this embodiment, the buttons are classified into a one-expansion button, all-expansion button, collapse button, and switching button.

The one-expansion button is a button for selecting a target branch and expanding into child branches of the target branch. The all-expansion button is a button for selecting a predetermined value of a target branch and expanding all levels down to the predetermined value. The collapse button is a button for selecting a target branch and collapsing it to its parent branch. The switching button is a button for selecting a branch corresponding to the same level as that of a displayed branch and making transition. These buttons can be assigned to each setting value tree or can be assigned for handling plural setting value trees at one time.

(Concrete Example of UI)

Display examples of a UI will be described below with reference to FIGS. 5 to 22.

Figure 5:
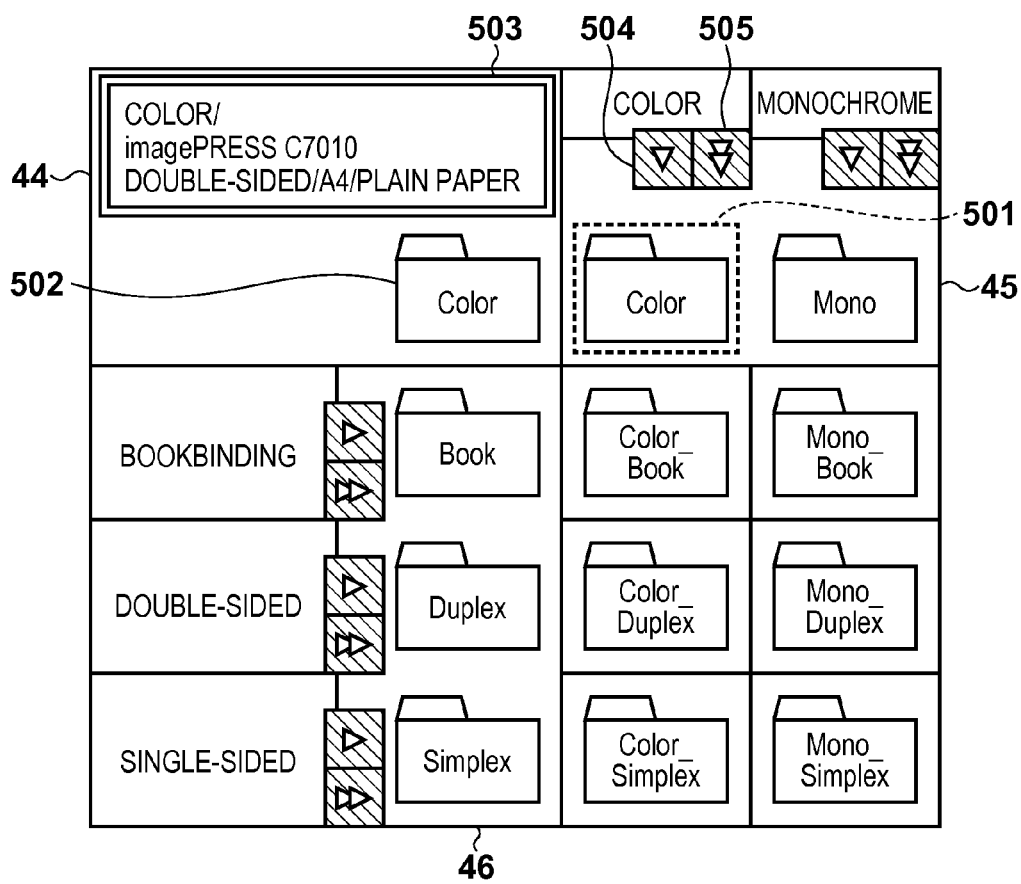
FIG. 5 is a view showing a display example of a setting value tree combination window.

FIG. 5 is a view of a UI as an initial display in the unexpanded status of both setting value tree A and setting value tree B. For this reason, the UI does not display the areas of the setting value tree A display area 42, setting value tree B display area 43, and collapse button group 41. The setting value tree A element list 45 displays branches corresponding to setting values of "COLOR" and "MONOCHROME". The setting value tree B element list 46 displays branches corresponding to setting values of "BOOKBINDING", "DOUBLE-SIDED", and "SINGLE-SIDED". The setting value tree A element list 45 and the setting value tree B element list 46 display virtual hot folders corresponding to the respective branches. For example, "Color" is displayed on a virtual hot folder corresponding to "COLOR". To input job data to this virtual hot folder "Color" is to designate only a restriction termed "COLOR" when selecting an image forming apparatus which executes a job.

FIG. 5 shows a status in which the virtual hot folder "Color" is selected, with a cursor 501 surrounded by a dotted-line rectangle indicating the selection. At this time, the currently selected setting information 44 displays the selected virtual hot folder "Color" (selected virtual hot folder 502), and a button 503 surrounded by a double-line rectangle displays the currently selected predetermined values. That is, the selected predetermined values in FIG. 5 indicates "COLOR/imagePRESS C7010" on setting value tree A, and "DOUBLE-SIDED/A4/PLAIN PAPER" on setting value tree B. Inputting job data to the virtual hot folder "Color" as it is, will issue a job with this predetermined value settings. As a consequence, the job is sent to a corresponding actual hot folder or image forming apparatus. Assume that default settings on the UI are defined in advance as indicated by the button 503.

Note that "imagePRESS C7010" indicates a printer model. If plural printer devices are connected as devices of the applicable model, it depends on the assignment method in the system which one of the printer devices is used to print. When the user wants to designate a specific printer device, it is required to narrow down printer devices on the UI. The setting combination table 47 displays 2×3=6 virtual hot folders corresponding to combinations with the two setting values ("COLOR" and "MONOCHROME" of the setting value tree A element list 45) and the three setting values ("BOOKBINDING", "DOUBLE-SIDED", and "SINGLE-SIDED" of the setting value tree B element list 46). If, for example, the user designates the virtual hot folder "Color_Book" corresponding to the combination of the setting "COLOR" and the setting "BOOKBINDING", an image forming apparatus which executes a job is selected by designating restrictions of the two settings "COLOR" and "BOOKBINDING".

Moving the cursor surrounded by the dotted-line rectangle on the UI can switch the currently selected virtual hot folder. Moving the cursor will change the values of a cursor position (setting value tree A) 2513 and cursor position (setting value tree B) 2514 of the setting value tree combination display status data 107 shown in FIG. 25B. Moving the cursor will update various types of information displayed on the currently selected setting information 44.

Figure 6:
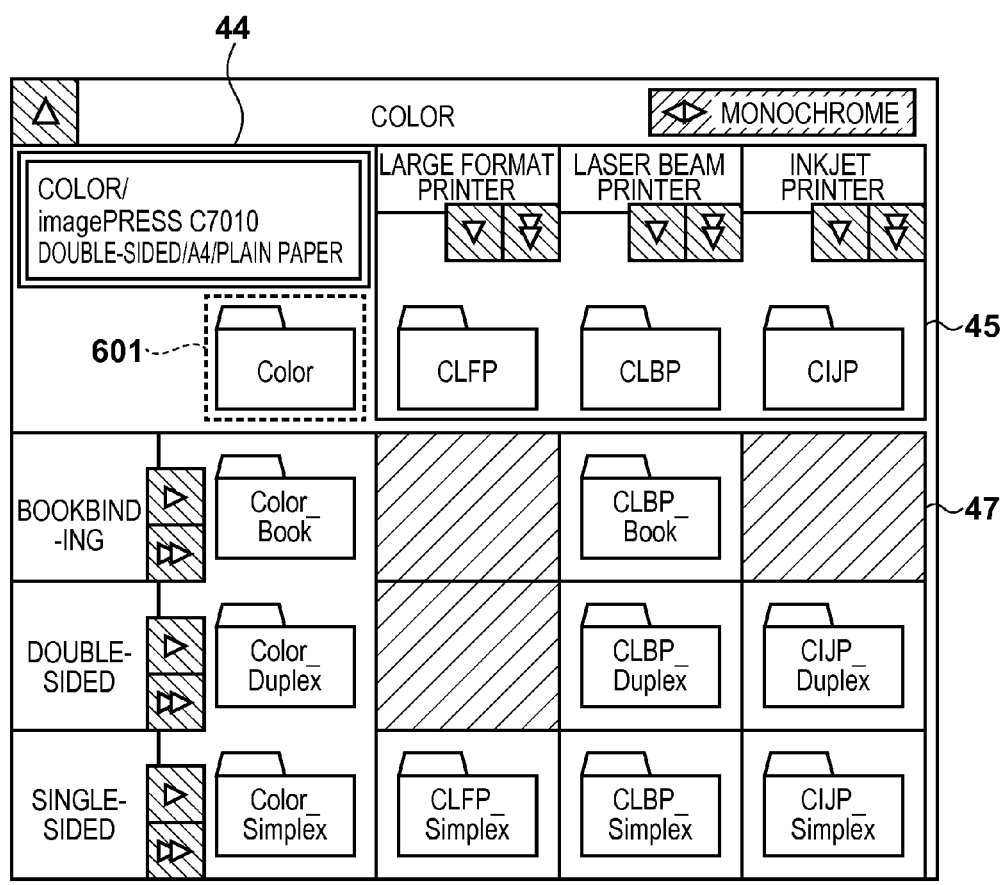
FIG. 6 is a view showing a display example of a setting value tree combination window.
Figure 20:
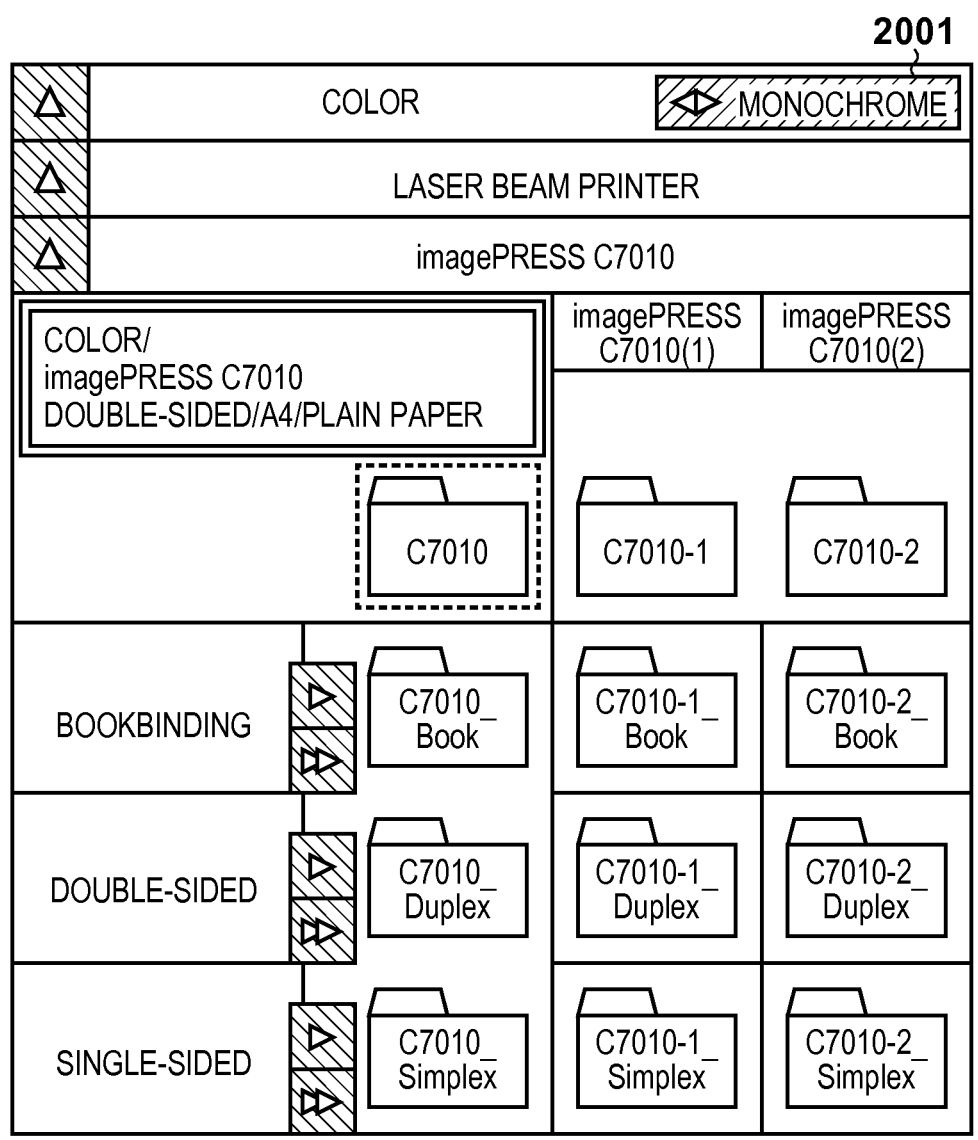
FIG. 20 is a view showing a display example of a setting value tree combination window.
Figure 21:
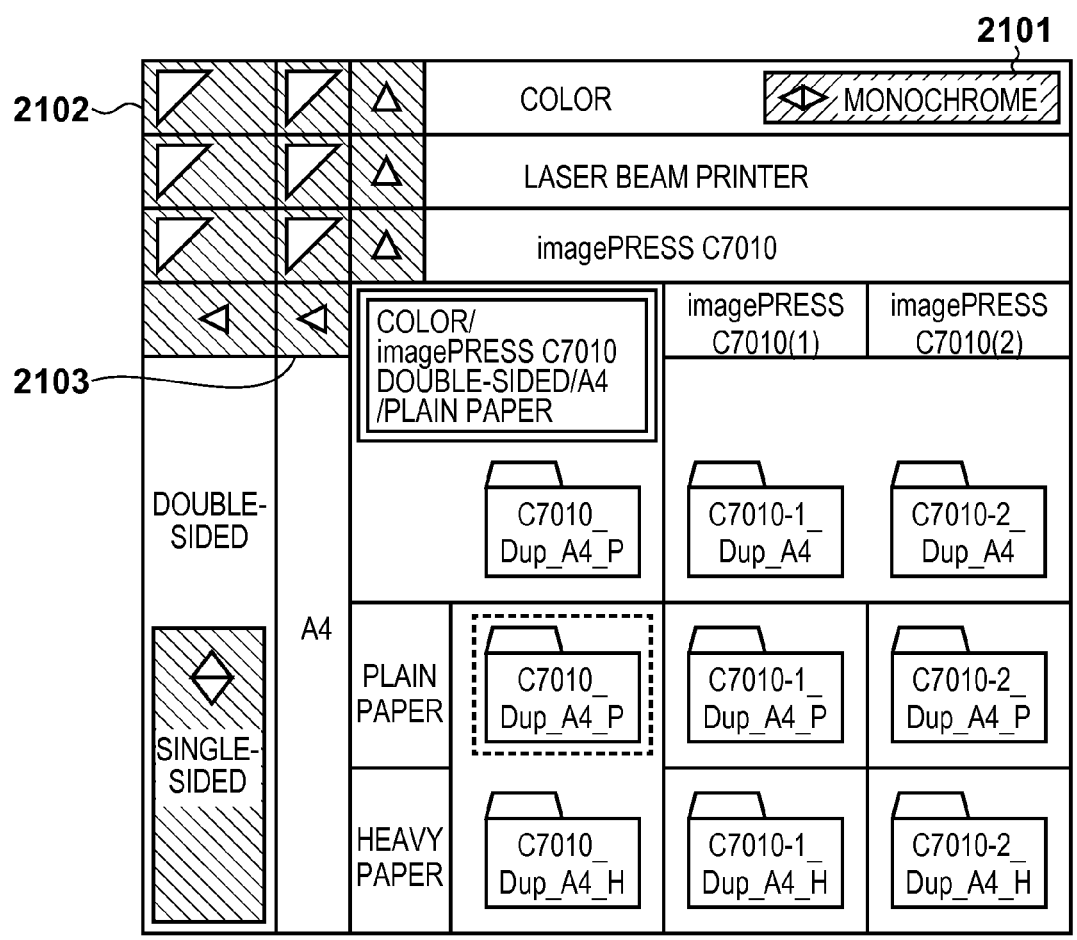
FIG. 21 is a view showing a display example of a setting value tree combination window.

Buttons for expanding branches are displayed on the respective branches of the setting value tree A element list 45 and setting value tree B element list 46. For example, when the user presses a one-expansion button 504 of "COLOR" in FIG. 5, the branches of "COLOR" of setting value tree A are expanded by one level and displayed as shown in FIG. 6. When the user presses an all-expansion button 505 of "COLOR" in FIG. 5, the current predetermined value "imagePRESS C7010" of setting value tree A is selected and expanded to be displayed as shown in FIG. 20. When the user presses the button 503 surrounded by the double-line rectangle on the upper left position on which the predetermined values are displayed in FIG. 5, setting value tree A and setting value tree B are expanded to each the predetermined value and displayed as shown in FIG. 21. Note that since "PLAIN PAPER" of setting value tree B corresponds to a terminal branch, a branch below "PLAIN PAPER" is not expanded as shown in FIG. 21.

FIG. 6 shows a status in which the branches of "COLOR" are expanded by one level from the status shown in FIG. 5. In this status, the setting value tree A element list 45 displays "LARGE FORMAT PRINTER", "LASER BEAM PRINTER", and "INKJET PRINTER". A cursor 601 surrounded by the dotted-line rectangle is placed on the currently selected setting information 44. In this status, the virtual hot folder "Color" is selected.

Referring to FIG. 20, the branch indicating "COLOR" in the setting value tree A display area 42 displays a switching button 2001 to switch to "MONOCHROME". This is because the branch data of "MONOCHROME" is registered as the contrast ID 2505 of the branch data of "COLOR" in the tree structure A database 106a having the data in the form shown in FIG. 25A. That is, in this case, "COLOR" and "MONOCHROME" are contrast branches at the same level. When the user presses a switching button 2101 to switch to "MONOCHROME" on the UI in FIG. 21, setting value tree A switches to the status in which the branch of "MONOCHROME" is selected. When the user presses the switching button, the status of other setting items are maintained without changing any settings as long as corresponding settings exist. That is, in the case shown in FIG. 21, when "MONOCHROME" is selected, the setting "PLAIN PAPER" on setting value tree B is maintained as long as the setting "PLAIN PAPER" can be configured.

The collapse button of "COLOR" is placed at the position of the collapse button group 41 located on the left of "COLOR" in FIG. 6. Pressing this button will make transition to the status of FIG. 5.

Referring to FIG. 6, the area of the setting combination table 47 is divided into 3×3=9 areas. Areas of these areas in which no corresponding virtual hot folders exist display no virtual hot folder icons and are grayed out. This is based on the setting "unable" on the able/unable 2604 of combined data with the branch ID of setting value tree A "LARGE FORMAT PRINTER" and the branch ID of setting value tree B "BOOKBINDING" in the virtual hot folder database 106c shown in FIG. 26A. Likewise, "unable" is set concerning the combined data with the branch ID of setting value tree A "LARGE FORMAT PRINTER" and the branch ID of setting value tree B "DOUBLE-SIDED" and the combined data with the branch ID of "INKJET PRINTER" of setting value tree A and the branch ID of setting value tree B "BOOKBINDING".

Figure 7:
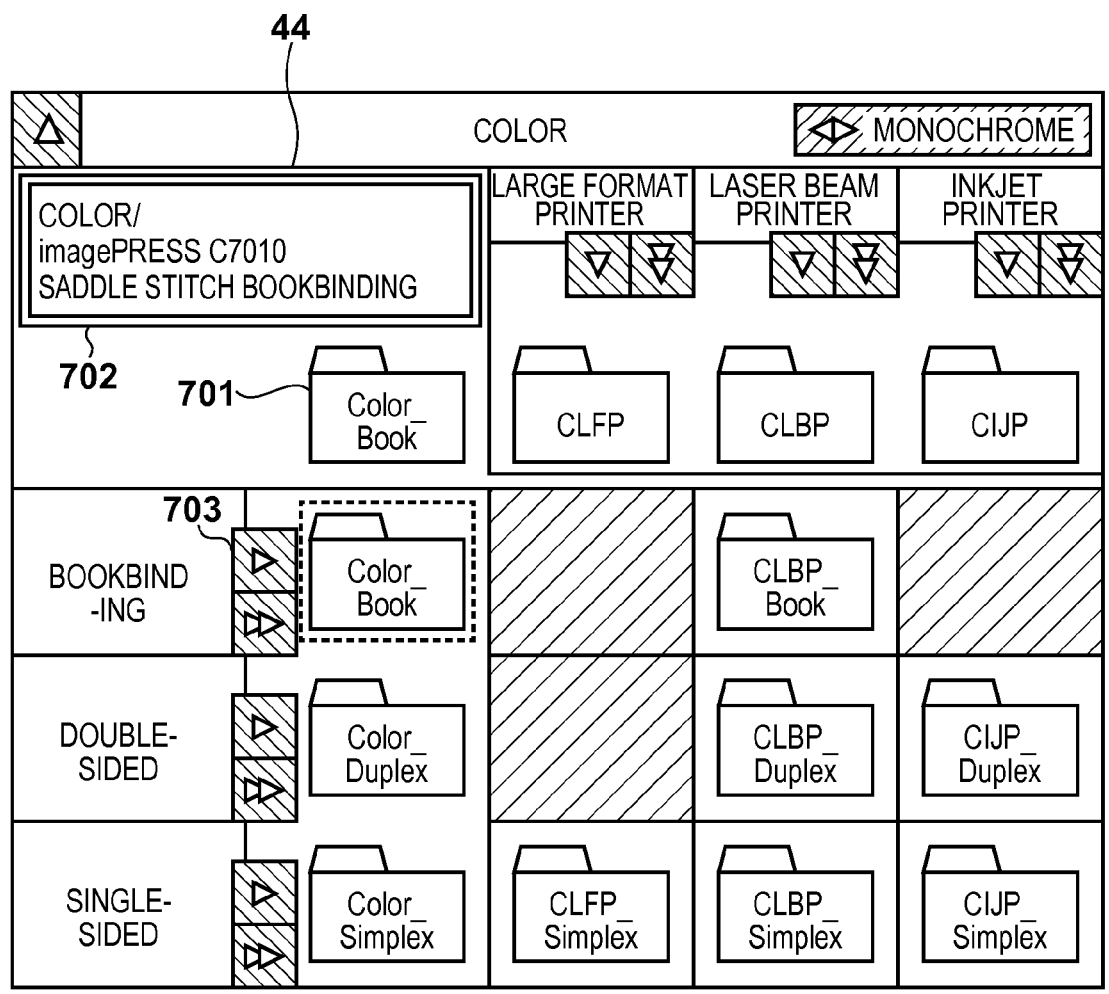
FIG. 7 is a view showing a display example of a setting value tree combination window.

Moving the cursor 601 downward in FIG. 6 will display the UI in FIG. 7. FIG. 7 shows a status in which the setting value tree A "COLOR" and the setting value tree B "BOOKBINDING" are selected. At this time, the currently selected setting information 44 displays a virtual hot folder 701 of "Color_Book". This name is set at the virtual hot folder name 2603 (FIG. 26A) in the virtual hot folder database 106c. A button 702 surrounded by a double-line rectangle displays the predetermined value "COLOR/imagePRESS C7010" of setting value tree A and the predetermined value "SADDLE STITCH BOOKBINDING" of setting value tree B. In this case, the branch ID of setting value tree A and the branch ID of setting value tree B are respectively set on the predetermined value IDs 2606 and 2607 in the virtual hot folder database 106c.

Note that the tree structure of setting value tree A corresponds to "COLOR/LASER BEAM PRINTER/imagePRESS C7010". However, in the tree structure A database 106a shown in FIG. 25A, since the character string "LASER BEAM PRINTER" is omitted as a registered character string of the display path 2504 of the corresponding branch data, the above display appears. In addition, although the tree structure of setting value tree B corresponds to "BOOKBINDING/SADDLE STITCH BOOKBINDING", "SADDLE STITCH BOOKBINDING" is only displayed because the above value is set at the display path 2504 of the corresponding branch data in the tree structure B database 106b.

Figure 8:
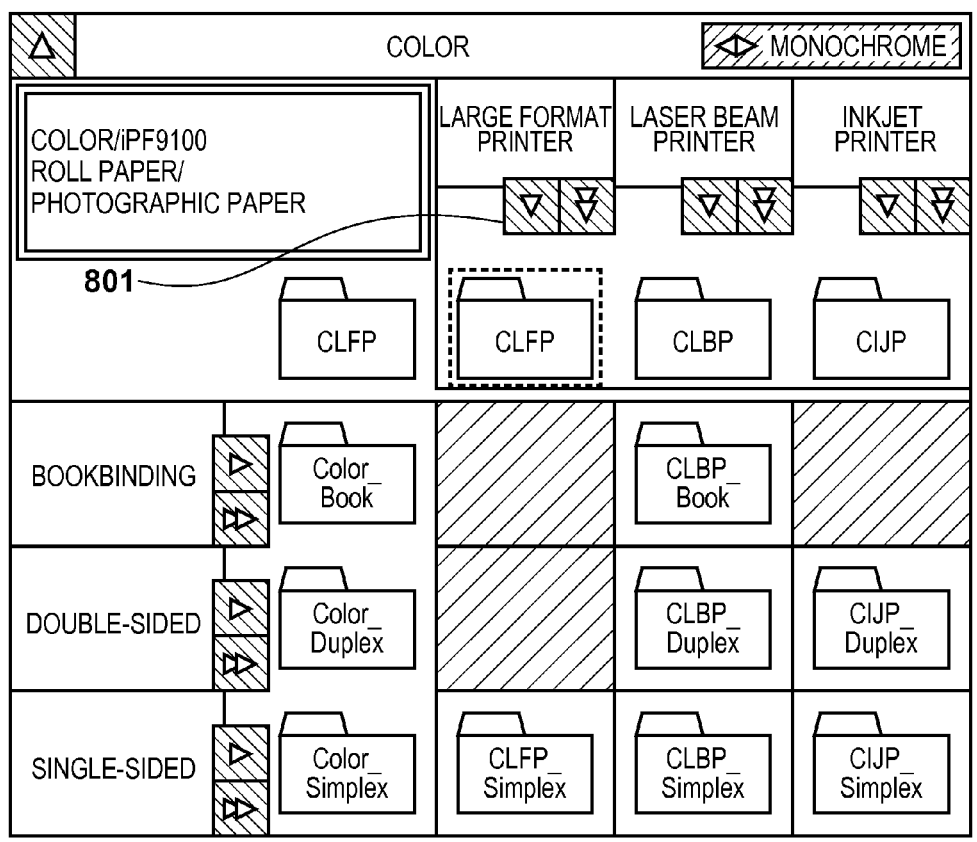
FIG. 8 is a view showing a display example of a setting value tree combination window.

Moving the cursor 601 to the right in FIG. 6 will display the UI in FIG. 8. FIG. 8 shows a status in which the setting value tree A "LARGE FORMAT PRINTER" and the root branch at the highest level (branch ID=0) of setting value tree B are selected.

Figure 9:
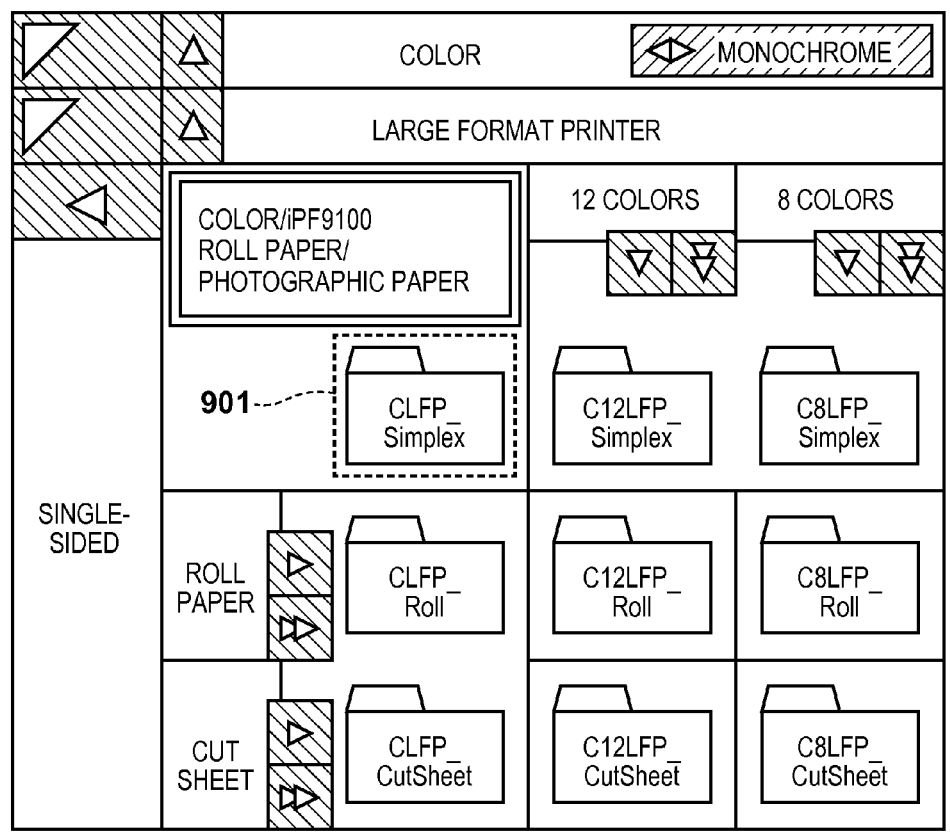
FIG. 9 is a view showing a display example of a setting value tree combination window.

When the user presses a one-expansion button 801 of "LARGE FORMAT PRINTER" in FIG. 8, the UI in FIG. 9 is displayed. Referring to FIG. 9, "COLOR/LARGE FORMAT PRINTER" is expanded on setting value tree A, and the setting value tree A element list 45 displays "12 COLORS" and "8 COLORS". On setting value tree B, "LARGE FORMAT PRINTER" is not combined with "BOOKBINDING" and "DOUBLE-SIDED" as described above, "SINGLE-SIDED" is automatically selected. That is, if deciding a job setting value on one setting value tree will specify one job setting value on the other setting value tree, the apparatus automatically selects a combination and shows it to the user. The setting value tree B element list 46 displays "ROLL PAPER" and "CUT SHEET".

Figure 11:
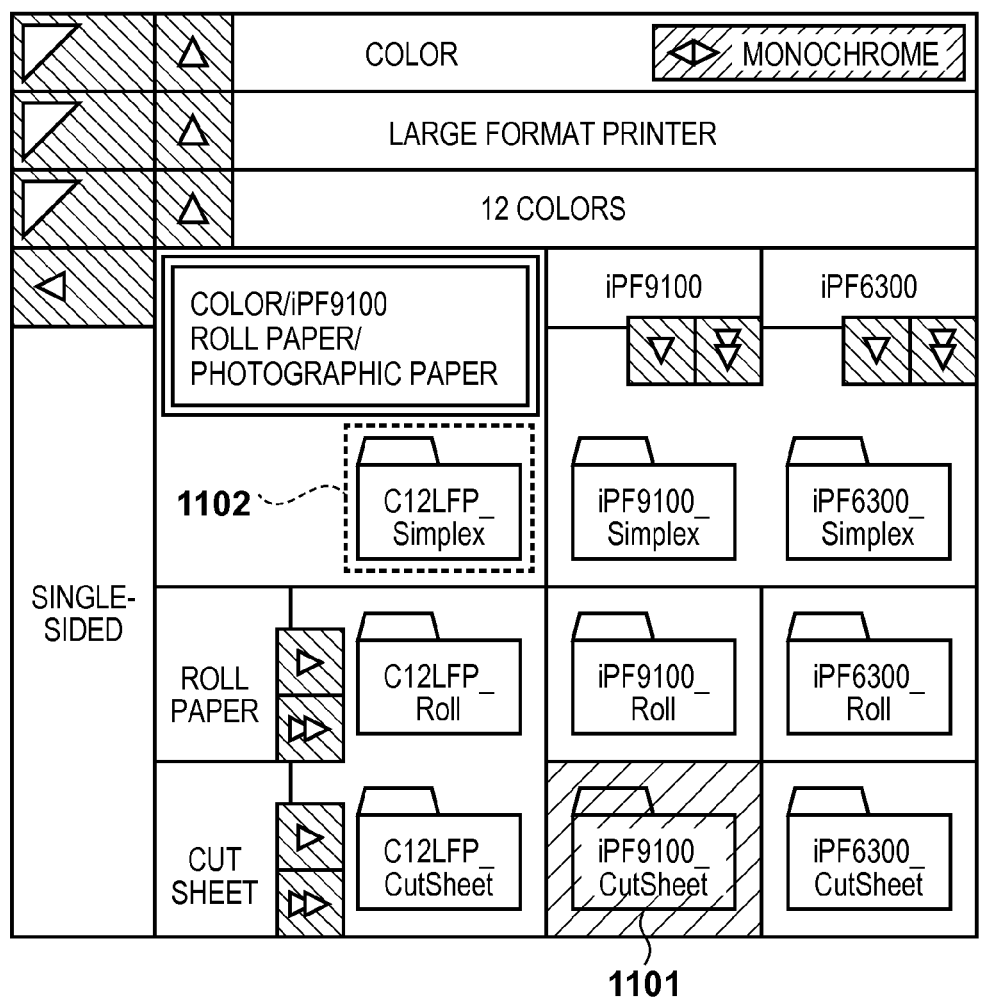
FIG. 11 is a view showing a display example of a setting value tree combination window.

Moving a cursor 901 surrounded by the dotted-line rectangle in FIG. 9 to the right will display the UI in FIG. 10. Pressing a one-expansion button 1001 of "12 COLORS" in FIG. 10 will display the UI in FIG. 11. Referring to FIG. 11, although the apparatus displays a virtual hot folder 1101 at the position of the combination of the setting "iPF9100" and the setting "CUT SHEET", the folder is grayed out. This indicates that although this setting is not "unable", it cannot be temporarily used due to some factor such as paper out.

Figure 13:
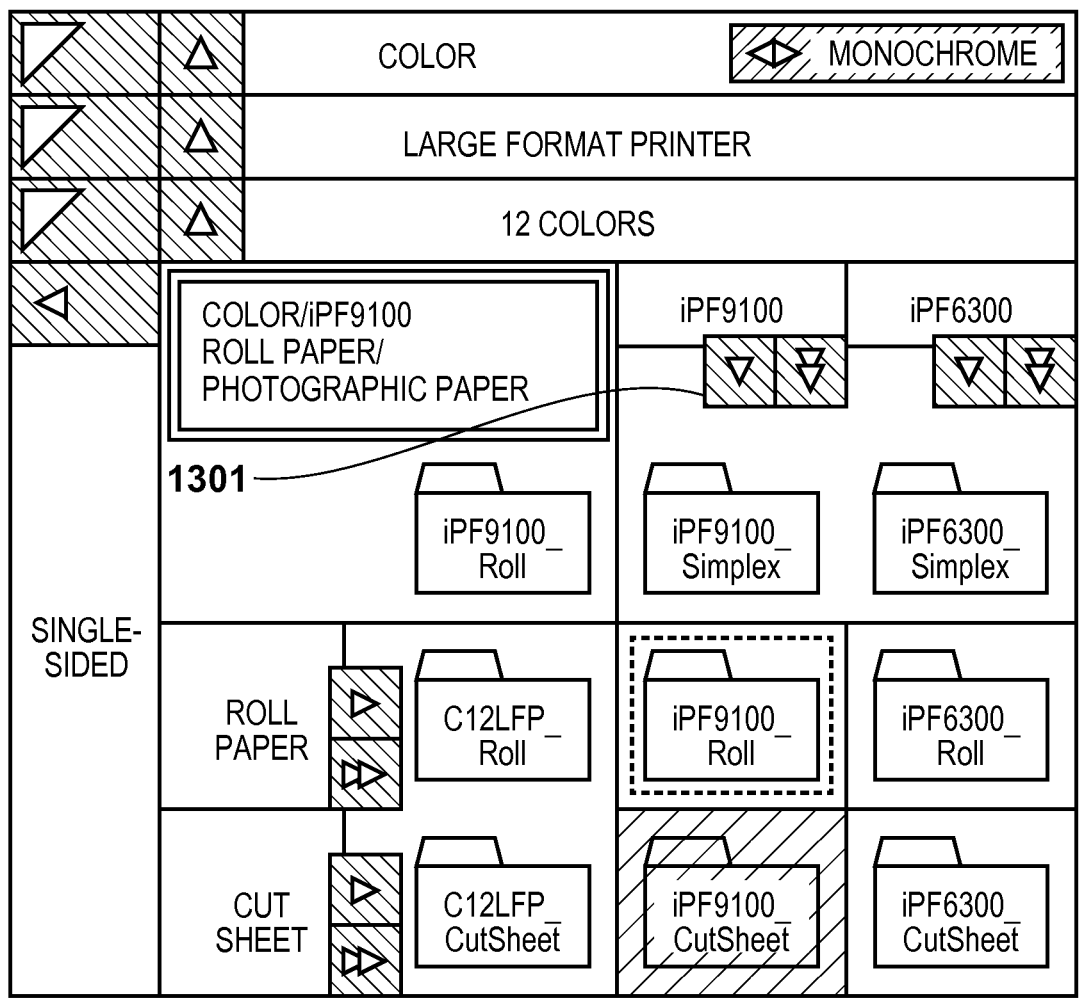
FIG. 13 is a view showing a display example of a setting value tree combination window.
Figure 16:
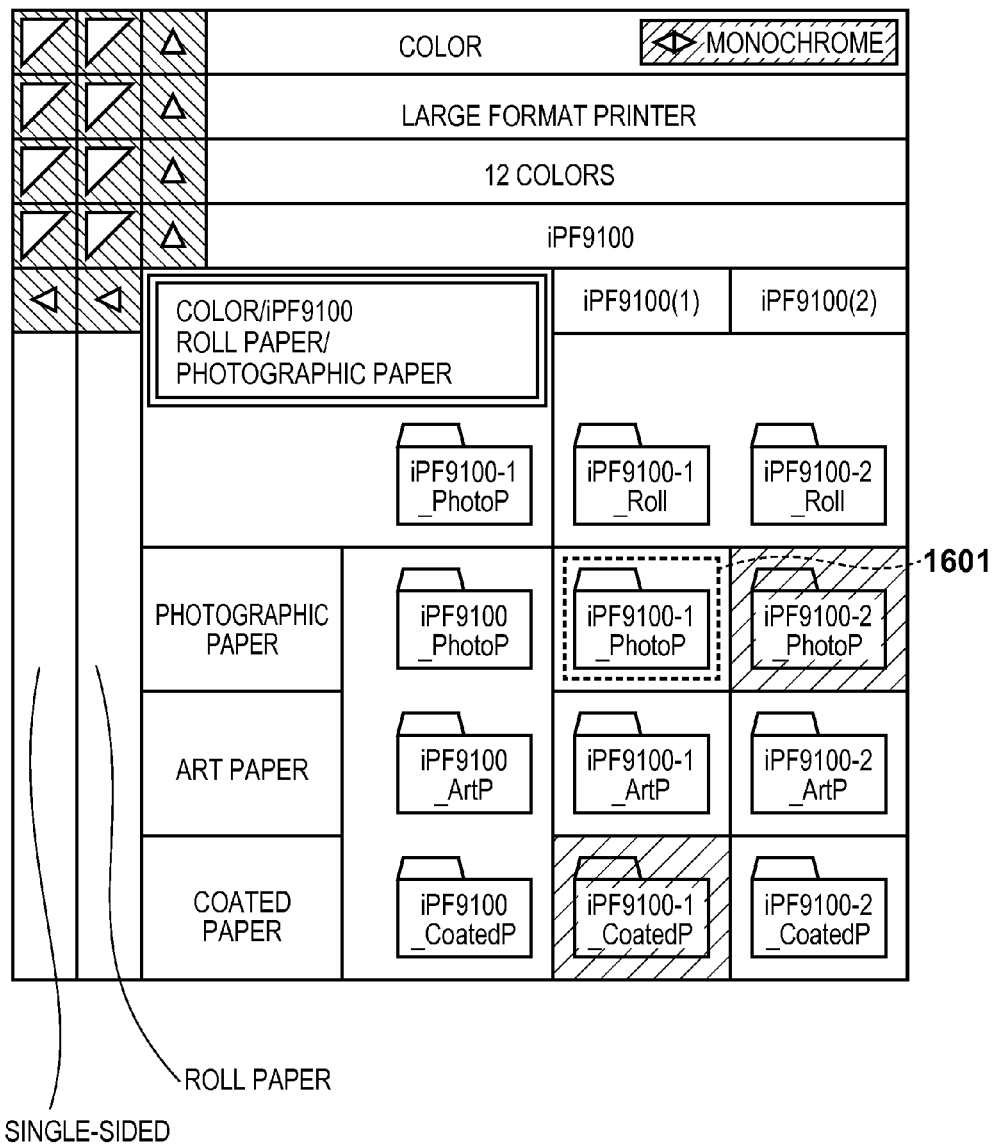
FIG. 16 is a view showing a display example of a setting value tree combination window.

Moving a cursor 1102 surrounded by the dotted-line rectangle in FIG. 11 to the right will display the UI in FIG. 12. Moving a cursor 1201 surrounded by the dotted-line rectangle in FIG. 12 downward will display the UI in FIG. 13. Referring to FIG. 13, pressing a one-expansion button 1301 of "iPF9100" will display the UI in FIG. 14. Referring to FIG. 14, "iPF9100" is expanded on setting value tree A, and the setting value tree A element list 45 displays "iPF9100(1)" and "iPF9100(2)". This is because plural devices of the same model are registered. According to setting value tree B, a combination of "iPF9100" and "CUT SHEET" cannot be used, and hence the setting value tree B element list 46 on which the branches of "ROLL PAPER" are expanded displays "PHOTOGRAPHIC PAPER", "ART PAPER", and "COATED PAPER".

Moving a cursor 1401 surrounded by the dotted-line rectangle in FIG. 14 to the right will display the UI in FIG. 15. Moving a cursor 1501 surrounded by the dotted-line rectangle in FIG. 15 downward will display the UI in FIG. 16. Moving a cursor 1601 surrounded by the dotted-line rectangle in FIG. 16 downward will display the UI in FIG. 17. That is, moving the cursor will also switch the display of the button surrounded by the double-line rectangle displayed on the currently selected setting information 44.

Figure 18:
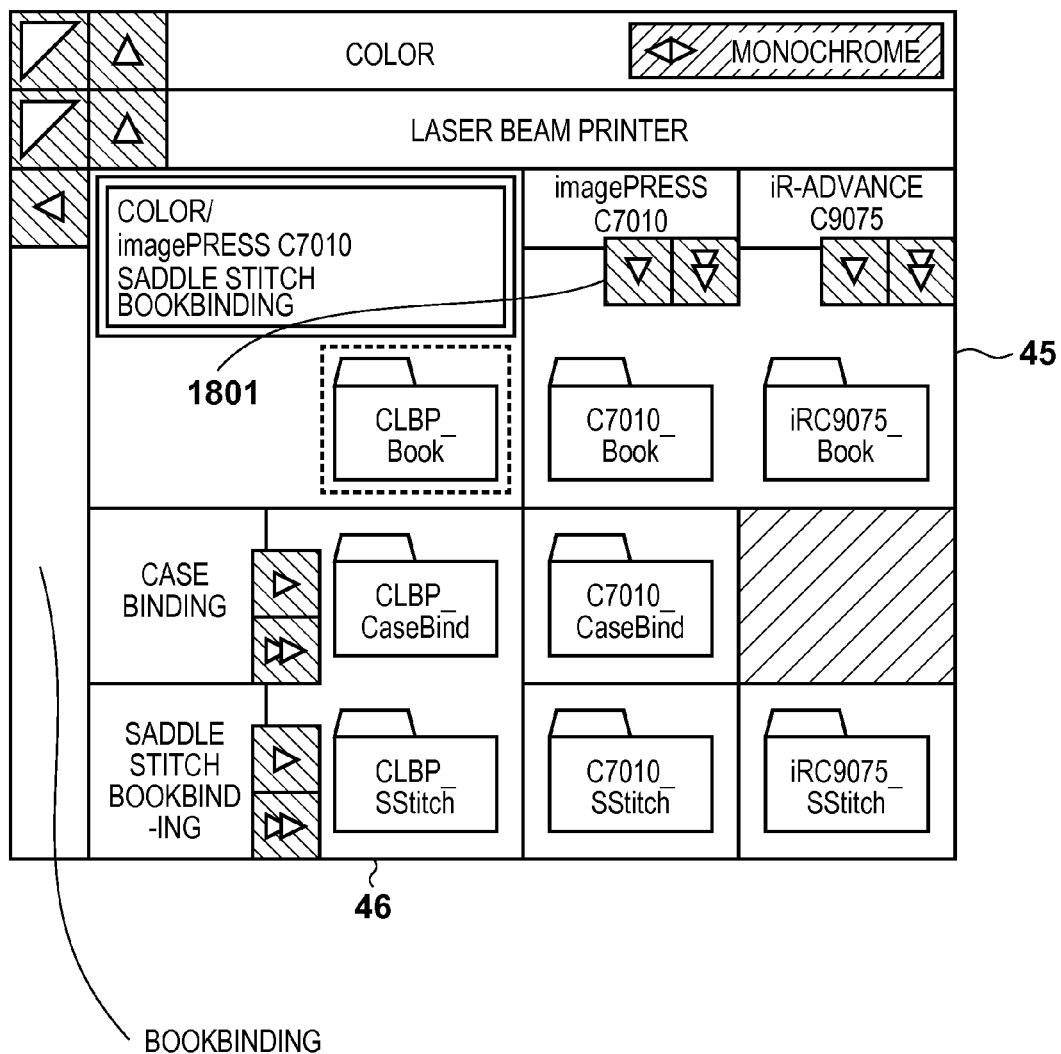
FIG. 18 is a view showing a display example of a setting value tree combination window.

Pressing a one-expansion button 703 of the branches of "BOOKBINDING" in FIG. 7 will display the UI in FIG. 18. Since setting value tree B "BOOKBINDING" can be combined with only the branch of "LASER BEAM PRINTER" on setting value tree A, the branch of "COLOR/LASER BEAM PRINTER" is selected on setting value tree A. The setting value tree A element list 45 then displays "imagePRESS C7010" and "iR-ADVANCE C9075". The setting value tree B element list 46 displays "CASE BINDING" and "SADDLE STITCH BOOKBINDING". That is, if there is only one branch selectable for child setting items, the apparatus can be configured to select the branch of the child setting item and simultaneously change the UI window to a UI window displaying the branch of the grandchild setting items.

Figure 19:
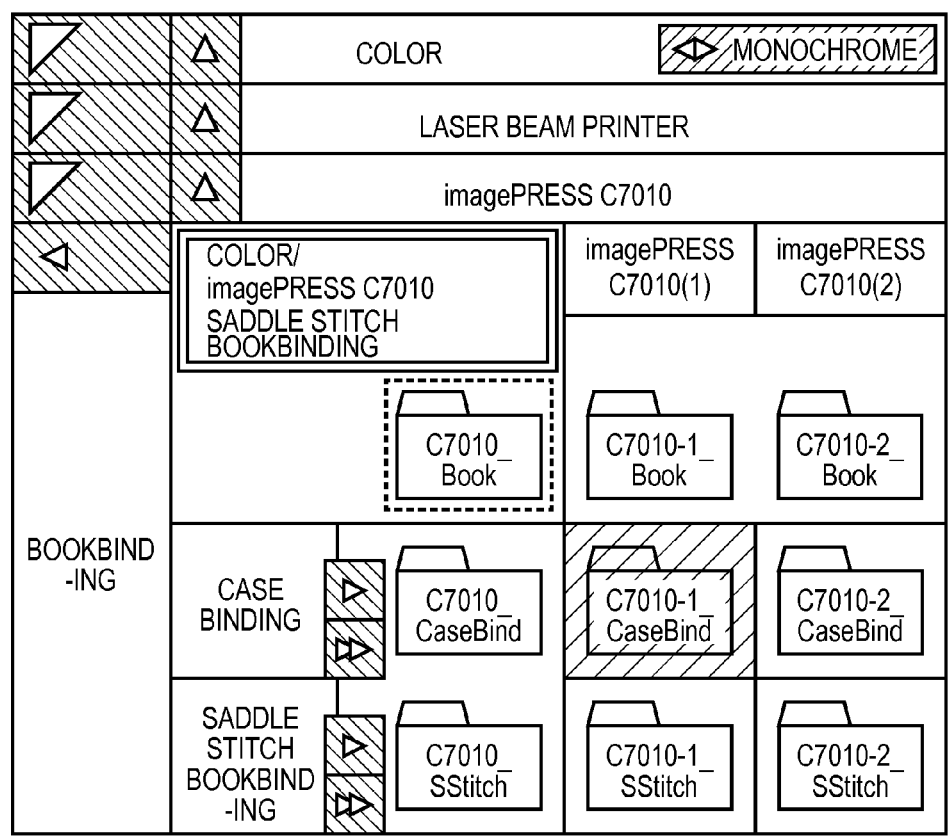
FIG. 19 is a view showing a display example of a setting value tree combination window.

Pressing a one-expansion button 1801 of the branches of "imagePRESS C7010" in FIG. 18 will display the UI in FIG. 19. The collapse button group 41 includes a collapse button for collapsing both setting value tree A and setting value tree B. Pressing, for example, a collapse button 2102 corresponding to the crossing portion with "COLOR" and "DOUBLE SIDED" at the upper left position in FIG. 21 will display the UI in FIG. 5.

Right-clicking a collapse button 2103 of setting value tree B "A4" in FIG. 21 will display an element list 2201 from the parent of the branch, as shown in FIG. 22. The element list 2201 displays branches having the same parent ID 2502 shown in FIG. 25A. For example, if there are plural branch candidates to which the setting value can change, the element list 2201 displays those plural branch candidates. If there is a branch which cannot be combined with the branch selected on the other setting value tree (setting value tree A in this case), such branch may not be displayed on the element list 2201 or may be displayed without allowing the user to select it. Clicking, for example, "A3" included in the element list 2201 can make transition, at once, to the status in which "A3" is selected.

[Job Input UI]

FIGS. 23A and 23B each show an example of a user interface used to issue an instruction for inputting job data. When the user selects a job to be input from a job list 2301 shown in FIG. 23A by right clicking, the apparatus displays a menu list 2302. When the user selects "INPUT JOB" menu item 2303 from the menu list 2302 (FIG. 23B), the display shifts to the UI in FIG. 4 which is used to designate a virtual hot folder. There are available two methods, namely, a method of designating a virtual hot folder after selecting a job and a method of selecting a job after designating a virtual hot folder. It is possible to use either of the methods.

As described above, the present invention can narrow down information by combining plural setting value trees and facilitate searching for a hot folder of the desired job settings. In addition, it is possible to easily grasp the presence/absence and availability of setting combinations by referring to them displayed in a tabular form. Furthermore, it is possible to cope with addition or the like of a device or printing paper by changing a tree structure concerning one setting item. This makes it unnecessary to register all combinations of hot folders one by one. It is therefore possible to improve the operation efficiency.

Second Embodiment

The first embodiment has exemplified the two-dimensional table based on the combination of two setting value trees (setting value trees A and B). The second embodiment may use, as a user interface, a three or more dimensional table based on the combination of three or more setting value trees. For example, when combining three setting value trees, it is possible to use three dimensional UI. This makes it possible to obtain the same effects as those of the first embodiment.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-100352, filed Apr. 25, 2012, which is hereby incorporated by reference herein in its entirety.

What is claimed is:

1. An information processing apparatus which provides a hot folder which issues a job with job setting values corresponding to the hot folder when inputting job data, the apparatus comprising:

a storage unit configured to store a first setting value tree and a second setting value tree, wherein each of the first and second setting value trees is expressed in a tree structure which defines a parent-child relationship between plural job setting values; and a display unit configured to display plural hot folders in a tabular form in which job setting values corresponding to selectable branches of the first setting value tree are arranged along a horizontal line and in which job setting values corresponding to selectable branches of the second setting value tree are arranged along a vertical line, wherein the plural hot folders correspond to combinations of job setting values corresponding to the selectable branches of the first setting value tree and job setting values corresponding to the selectable branches of the second setting value tree.

2. The apparatus according to claim 1, wherein said display unit does not display a hot folder corresponding to a combination of job setting values which are not configured to be combined.

3. The apparatus according to claim 1, wherein said display unit displays information indicating that a hot folder corresponding to a combination of job setting values which are not available due to a status of an image forming apparatus is not currently available.

4. The apparatus according to claim 1, wherein said display unit switches hot folders to be displayed by expanding or collapsing the job setting values corresponding to the selectable branches of the first and second setting value trees in accordance with hierarchical structures of the first and second setting value trees.

5. The apparatus according to claim 1, wherein said display unit displays the plural hot folders and the job setting values corresponding to the hot folders in the tabular form.

6. The apparatus according to claim 5, wherein when displaying in the tabular form, said display unit includes buttons for simultaneously designating each level of plural setting value trees, which are arranged at positions where vertical lines and horizontal lines of a table assigned to the respective levels of the plural setting value trees intersect with each other.

7. The apparatus according to claim 1, wherein if the storage unit further stores a third setting value tree, said display unit displays hot folders in a three dimensional UI in which job setting values corresponding to selectable branches of the first to third setting value trees are three dimensionally arranged.

8. The apparatus according to claim 1, wherein said display unit further displays buttons for designating levels on the plural setting value trees.

9. The apparatus according to claim 1, wherein if selecting a job setting value on one setting value tree of plural setting value trees specifies one job setting value on the other setting value tree to be combined, said display unit displays a hot folder corresponding to a combination of the selected job setting value and the specified job setting value.

10. The apparatus according to claim 1, wherein said display unit displays a button for changing a job setting value corresponding to a hot folder selected by a user.

11. The apparatus according to claim 1, wherein said display unit displays a button for displaying a job setting value defined as an initial value in accordance with a hierarchical structure of each of plural setting value trees.

12. The apparatus according to claim 1, wherein said display unit displays a list of job setting value candidates of job setting values enable to be changed when changing job setting values corresponding to a hot folder selected by a user.

13. The apparatus according to claim 1, wherein a setting value tree including job setting values of setting items based on a model of an image forming apparatus is combined with a setting value tree including job setting values of setting items based on a printing medium.

14. An information processing method which provides a hot folder which issues a job with job setting values corresponding to the hot folder when inputting job data, the method comprising:

storing a first setting value tree and a second setting value tree, wherein each of the first and second setting value trees is expressed in a tree structure which defines a parent-child relationship between plural job setting values; and displaying plural hot folders in a tabular form in which job setting values corresponding to selectable branches of the first setting value tree are arranged along a horizontal line and in which job setting values corresponding to selectable branches of the second setting value tree are arranged along a vertical line, wherein the plural hot folders correspond to combinations of job setting values corresponding to the selectable branches of the first setting value tree and job setting values corresponding to the selectable branches of the second setting value tree.

15. A non-transitory computer-readable medium storing a program for causing a computer to function as a storing unit configured to store a first setting value tree and a second setting value tree, wherein each of the first and second setting value trees is expressed in a tree structure which defines a parent-child relationship between plural job setting values, and a display unit configured to display plural hot folders in a tabular form in which job setting values corresponding to selectable branches of the first setting value tree are arranged along a horizontal line and in which job setting values corresponding to selectable branches of the second setting value tree are arranged along a vertical line, wherein the plural hot folders correspond to combinations of job setting values corresponding to the selectable branches of the first setting value tree and job setting values corresponding to the selectable branches of the second setting value tree.

* * * * *